United States Patent
Komiya et al.

(10) Patent No.: US 8,530,698 B2
(45) Date of Patent: Sep. 10, 2013

(54) PACKING MATERIAL FOR LIQUID CHROMATOGRAPHY AND PROCESS FOR SEPARATION AND PURIFICATION OF BIOPOLYMER BY MEANS OF THE PACKING MATERIAL

(75) Inventors: Katsuo Komiya, Shunan (JP); Koji Nakamura, Shunan (JP)

(73) Assignee: Tosoh Corporation, Shunan-shi (JP)

( * ) Notice: Subject to any disclaimer, the term of this patent is extended or adjusted under 35 U.S.C. 154(b) by 633 days.

(21) Appl. No.: 12/640,912

(22) Filed: Dec. 17, 2009

(65) Prior Publication Data
US 2010/0160605 A1 Jun. 24, 2010

(30) Foreign Application Priority Data

Dec. 18, 2008 (JP) ................. 2008-322642
Mar. 11, 2009 (JP) ................. 2009-058122

(51) Int. Cl.
*C07C 229/08* (2006.01)
*B01D 15/08* (2006.01)
(52) U.S. Cl.
USPC ........................... 562/575; 210/635
(58) Field of Classification Search
CPC .................. A61K 8/44; B01D 15/08
See application file for complete search history.

(56) References Cited

U.S. PATENT DOCUMENTS

| 5,453,186 | A | 9/1995 | Muller et al. |
| 5,652,348 | A | 7/1997 | Burton et al. |
| 5,945,520 | A | 8/1999 | Burton et al. |
| 6,686,457 | B1 | 2/2004 | Nilsson |

FOREIGN PATENT DOCUMENTS

| DE | 3605908 A1 * | 2/1986 |
| DE | 36 05 908 A1 | 10/1986 |
| JP | 3059443 B2 | 7/2000 |
| JP | 2008-232764 A | 10/2008 |
| WO | WO 00/69872 A2 | 11/2000 |
| WO | WO-2005/082483 A1 | 9/2005 |
| WO | WO-2009/063647 A1 | 5/2009 |

OTHER PUBLICATIONS

European Search Report issued Mar. 4, 2011, in European Patent Application No. 09179815.
Kasche, V. et al., "Rapid Protein Purification Using Phenylbutylamine-Eupergit: a Novel Method for Large-Scale Procedures," Journal of Chromatography, 510 (1990) p. 149-154.
Burton, S.C. et al., "Hydrophobic Charge Induction Chromatography: Salt Independent Protein Adsorption and Facile Elution with Aqueous Buffers," Journal of Chromatography A, 814 (1998) p. 71-81.
Schwartz, Warren, et al., "Comparison of Hydrophobic Charge Induction Chromatography With Affinity Chromatography on Protein A for Harvest and Purification of Antibodies," Journal of Chromatography A, 908 (2001) p. 251-263.

* cited by examiner

*Primary Examiner* — Paul A Zucker
(74) *Attorney, Agent, or Firm* — Birch, Stewart, Kolasch & Birch, LLP

(57) ABSTRACT

A packing material for liquid chromatography capable of separating and purifying, or collecting and recovering, a biopolymer such as a protein or a peptide by adsorption and desorption by a pH change without being influenced by the isoelectric point of the protein or by the salt concentration in a solvent in which the biopolymer such as the protein is dissolved. Separation and purification, or collection and recovery, of a biopolymer, is carried out by liquid chromatography by means of a packing material for liquid chromatography comprising a base matrix and a ligand immobilized to the base matrix, wherein the base matrix is a hydrophilic base matrix having alcoholic hydroxy groups on its surface, the ligand is at least one ligand selected from the group consisting of an α-amino acid which is immobilized to the base matrix by an amide bond or an urethane bond via the amino group contained in the α-amino acid.

8 Claims, No Drawings

PACKING MATERIAL FOR LIQUID CHROMATOGRAPHY AND PROCESS FOR SEPARATION AND PURIFICATION OF BIOPOLYMER BY MEANS OF THE PACKING MATERIAL

TECHNICAL FIELD

The present invention relates to a packing material for liquid chromatography suitable for separation and purification, or collection and recovery, of an ionic substance dissolved in an aqueous solution, particularly a biopolymer such as a protein or a peptide, and a process for adsorption and desorption of a protein by means of the packing material.

More particularly, it relates to a packing material for liquid chromatography to separate and purify a biopolymer such as a protein or a peptide in such a manner that a solute polymer is adsorbed in an acidic aqueous solution by utilizing an interaction between hydrophobic groups of the packing material and surface hydrophobic groups of the biopolymer, then the pH of the eluent is changed to neutral or weakly alkaline to change the packing material to be hydrophilic so that the adsorbed biopolymer such as a protein or a peptide is desorbed or eluted for recovery, and a process for adsorption and desorption by means of the packing material.

BACKGROUND ART

In many cases, a packing material for liquid chromatography to adsorb and desorb thereby to separate and purify a biopolymer such as a protein or a peptide, employs, as a base matrix, a hydrophilic packing material which does not adsorb a protein or a peptide in an aqueous solution, and has such a structure that functional groups which interact with a protein, are immobilized on the base matrix surface. As such a hydrophilic base matrix, one which is porous particles with pores having such a size as to permit a biopolymer to penetrate and which has a hydrophilic surface, is used, whereby if no functional groups are introduced, respective solutes will be eluted substantially in the order of larger molecular sizes.

Those which impart hydrophilicity to the base matrix are alcoholic hydroxy groups or non-ionic polar groups such as amide groups. Especially, hydroxy groups are used as reaction sites to immobilize specific functional groups.

One having hydrophobic groups introduced as functional groups, is a packing material for hydrophobic interaction chromatography or a packing material for reversed-phase chromatography.

The packing material for reversed-phase chromatography is used for an analysis in many cases where at the time of eluting a protein or the like, an eluent containing an organic solvent is required and the protein is denatured, so it is not utilized so much as a purifying means.

On the other hand, the hydrophobic interaction chromatography is a process for separation and purification, where a protein or the like is adsorbed in a highly concentrated salt solution, and the protein or the like can be eluted by lowering the salt concentration even without addition of an organic solvent. Such hydrophobic interaction chromatography is widely utilized in a frequency next to ion exchange chromatography as a means to separate and purify a desired substance while maintaining complex physiological activities of a biopolymer, and in many cases, it is used in combination with ion exchange chromatography. The main reasons for its use may, for example, be such that a protein may be separated in a mild solvent (composition, pH) at a mild temperature, that the packing material for hydrophobic interaction chromatography has a relatively good stability against a reagent for e.g. regeneration and cleaning, sterilization treatment or endotoxin-removal treatment, and its useful life is long, and further that the adsorption and desorption are carried out, based on a hydrophobic interaction with a biopolymer, and thus, it is different in the separation mechanism from a widely used ion exchange method.

Functional groups to be used for the packing material for hydrophobic interaction chromatography, may, for example, be non-ionic groups such as butyl, hexyl, octyl or phenyl groups.

In recent years, as a method to efficiently produce a specific protein (inclusive of a specific peptide), a method has been developed and used wherein recombinant cells are cultured to let them produce a protein in the cells or outside the cells. The concentration of the protein in the culture supernatant or homogenate solution is at a level of a few grams per liter even at highest and is usually much lower. Therefore, in order to produce a large amount of a protein, it is required to readily treat from a few hundred to a few thousand liters of the culture medium to collect a roughly purified product containing the desired protein. For this purpose, irrespective of what type of chromatography is employed, to increase the load capacity of the desired substance per unit volume of the packing material, is useful to shorten the operation time and to reduce the cost by compacting the installation and is an important factor for a purification technique for a protein (inclusive of a peptide).

Here, in hydrophobic interaction chromatography, in order to let a protein be adsorbed, a high concentration (usually at least 1.5 mols/liter) of ammonium sulfate, sodium sulfate or the like is required to be contained in the binding buffer. Accordingly, in order to treat a large amount of the culture supernatant or homogenate solution, a large amount of such a salt is required, and its disposal becomes problematic and tends to increase the purification cost.

On the other hand, ion exchange chromatography is suitable for adsorbing a protein from a solution having a low concentration of a salt, but the above-mentioned cell culture solution usually contains a salt at a level of at least physiological saline (at least about 0.15 mol/liter) in many cases, and it is necessary to lower the concentration of the coexisting salt by desalting or dilution in order to collect a protein by an ion exchanger. Accordingly, it is required to carry out pretreatment by a dialysis or desalting column by increasing one step, or to increase the volume of the culture solution by dilution, and either case is not suitable to readily collect the desired protein from the cell culture solution.

In recent years, V. Kasche et al. (Non-Patent Document 1), S. C. Burton et al. (Patent Document 1, Patent Document 2 and Non-Patent Document 2) and W. Schwarz et al. (Non-Patent Document 3) have reported that by means of a packing material having a ligand having both a weak anion exchange group and a hydrophobic group, immobilized on the above-mentioned hydrophilic base matrix, a protein may be adsorbed under a neutral to weakly basic pH condition without being substantially influenced by the concentration of a salt in the binding buffer, and then the eluent pH is made to be weakly acidic to ionize the anion exchange group of the ligand, whereby the packing material is changed to be hydrophilic and it is thereby possible to elute and recover the adsorbed protein. However, such a packing material is incapable of adsorbing a protein having an isoelectric point at a pH of at least 8.5, or even if it is capable of adsorbing such a protein, the amount of adsorption is limited to a level of at most a few mg/ml.

Further, A. Groenberg et al. (Patent Document 3) have reported that by means of such a packing material that a ligand having both a weak cation exchange group and a heteroaromatic ring constituted by carbon, sulfur and oxygen, is immobilized on a hydrophilic packing material, an antibody is selectively adsorbed under a weakly acidic pH condition, and then eluted under a weakly basic pH condition.

However, in the case of the packing material having immobilized a ligand having both a weak anion exchange group and a hydrophobic group, a protein or the like is adsorbed under a neutral or weakly basic condition, whereby a basic protein will receive an ion exclusion force, and in contrast, the majority of anion groups of an acidic protein will be ionized, so that the surface hydrophilicity will be high, the hydrophobic adsorption force will be weak, and the adsorption capacity will be small. On the other hand, in the case of the ligand-immobilized packing material as disclosed in Patent Document 3 wherein a ligand having both a weak cation exchange group and a heteroaromatic ring, is immobilized on a hydrophilic packing material, the specificity for adsorption of a specific protein (antibody) is strong, but its application to proteins in general is difficult and its application range is narrow.

Therefore, it is desired to develop a packing material which is capable of adsorbing a protein without being substantially influenced by the isoelectric point of the protein or by the concentration of a salt in the adsorbing solution at the time of the adsorption and capable of eluting the protein by controlling the pH condition at the time of the elution.

That is, by a conventional packing material, the amount of adsorption was likely to be changed by the physical property (such as the isoelectric point) of the protein or by the concentration of a salt in the solvent to dissolve a biopolymer such as a protein, and it was difficult to concentrate and recover a desired biopolymer such as a protein or a peptide from a large amount of a dilute cell culture solution.

For example, in the case of a packing material for ion exchange chromatography, a protein adsorption capacity at a level of about 100 g/liter (wet volume) can be obtained for a protein having a molecular weight of from about 10,000 to 70,000, although such a performance is limited in a solution having a low ionic strength. Further, in the case of a packing material for ion exchange chromatography, it is possible to further increase the protein adsorption capacity by immobilizing a hydrophilic graft polymer on the surface of the packing material and by introducing ion exchange groups to the graft polymer (e.g. Patent Document 4).

On the other hand, in hydrophobic interaction chromatography and reversed-phase partition chromatography, in the case of a protein having a molecular weight of from about 10,000 to 100,000, its adsorption capacity is not more than 65 mg/ml even at the maximum in a case where a hydrophobic ligand is immobilized on the packing material without a spacer or via a short chain spacer which is commonly used in affinity chromatography (a spacer having a carbon-carbon bond with a carbon chain length of from about 3 to 10 carbon atoms), even when a base matrix having a proper pore size and porosity is employed.

Further, also in hydrophobic interaction chromatography and reversed-phase partition chromatography, it is possible to introduce hydrophobic groups on the graft polymer as in the case of the above-mentioned packing material for ion exchange chromatography, but under a solvent condition to maintain a protein (inclusive of a peptide), the graft polymer having hydrophobic groups introduced, undergoes agglomeration and shrinkage, whereby the protein-adsorption capacity will not substantially increase, or may rather decrease. Accordingly, by adsorption and desorption, or by chromatography, based on hydrophobic bonds employing this type of packing material, it has been impossible to increase the adsorption capacity (e.g. Patent Document 5).

Patent Document 1: U.S. Pat. No. 5,652,348
Patent Document 2: U.S. Pat. No. 5,945,520
Patent Document 3: WO2005/082483
Patent Document 4: JP-A-2008-232764
Patent Document 5: Japanese Patent 3,059,443
Non-Patent Document 1: Journal of Chromatography, 510 (1990) p. 149-154
Non-Patent Document 2: Journal of Chromatography A, 814 (1998) p. 71-81
Non-Patent Document 3: Journal of Chromatography A, 908, 1-2 (2001) p. 251-263

DISCLOSURE OF THE INVENTION

Object to be Accomplished by the Invention

The present invention has been made in view of the above-described background art, and its object is to provide a novel packing material for liquid chromatography, whereby separation and purification, or collection and recovery, of a biopolymer such as a protein or a peptide can be carried out by adsorbing and desorbing it by a pH change without being influenced by the isoelectric point of the protein or the concentration of a salt in the solvent wherein the biopolymer such as a protein or a peptide is dissolved, and to provide a process for concentrating and recovering a desired biopolymer such as a protein from a large amount of dilute cell culture solution by means of such a packing material.

Means to Accomplish the Object

The present inventors have conducted an extensive study to accomplish the above object and as a result, have found a packing material for liquid chromatography, wherein a specific α-amino acid or aminomethyl benzoic acid is immobilized to a base matrix via an amide bond or an urethane bond, a packing material for liquid chromatography having a specific ligand immobilized directly to a base matrix and a specific ligand immobilized to the base matrix via a specific spacer, and a process for separation and purification, or collection and recovery, of a protein by means of such a packing material, and thus, they have accomplished the present invention.

That is, the present invention provides a packing material for liquid chromatography having hydrophobic amino acids immobilized, and a process for separation and purification, or collection and recovery, of a biopolymer by means of such a packing material, as shown below.

[1] A packing material for liquid chromatography comprising a base matrix and a ligand immobilized to the base matrix, wherein (1) the base matrix is a hydrophilic base matrix having alcoholic hydroxy groups on its surface, (2) the ligand is at least one ligand selected from the group consisting of an α-amino acid represented by the following formula (1):

$$RCH(NH_2)COOH \qquad (1)$$

wherein R is an aromatic group or a $C_{5-7}$ non-ionic aliphatic group, and an aminomethyl benzoic acid, (3) the ligand is immobilized to the base matrix by an amide bond or an urethane bond via the amino group contained in the compound represented by the formula (1), and (4) the amount of the ligand immobilized to the base matrix is at least 20 mmol per liter (wet volume) of the packing material for liquid chromatography.

[2] The packing material for liquid chromatography according to the above [1], wherein the α-amino acid is selected from the group consisting of phenylalanine, tryptophan, leucine, norleucine and α-aminooctanoic acid.

[3] The packing material for liquid chromatography according to the above [1] or [2], wherein the base matrix is a carrier for chromatography selected from a group consisting of a natural polymer carrier, a synthetic polymer carrier and an inorganic carrier.

[4] The packing material for liquid chromatography according to any one of the above [1] to [3], wherein the base matrix is porous particles, and the exclusion limit molecular weight thereof is at least 10,000 as calculated as pullulan.

[5] A packing material for liquid chromatography comprising a base matrix, a ligand immobilized directly to the base matrix and a ligand immobilized to the base matrix via a spacer, wherein (1) the base matrix is a hydrophilic base matrix having alcoholic hydroxy groups on its surface, (2) the spacer is a synthetic polymer having alcoholic hydroxy groups, or a polysaccharide, (3) the ligand is at least one ligand selected from the group consisting of an α-amino acid represented by the following formula (1):

$$RCH(NH_2)COOH \qquad (1)$$

wherein R is an aromatic group or a $C_{5-7}$ non-ionic aliphatic group, and an aminomethyl benzoic acid, (4) the ligand immobilized directly to the base matrix, is immobilized to the base matrix by an amide bond or an urethane bond via the amino group contained in the compound represented by the formula (1), (5) the ligand immobilized to the base matrix via a spacer, is immobilized to the spacer by an amide bond or an urethane bond via the amino group contained in the compound represented by the formula (1), and (6) the amount of the ligand immobilized to the base matrix is at least 30 mmol per liter (wet volume) of the packing material for liquid chromatography.

[6] The packing material for liquid chromatography according to the above [5], wherein the α-amino acid is selected from the group consisting of phenylalanine, tryptophan, leucine, norleucine and α-aminooctanoic acid.

[7] The packing material for liquid chromatography according to the above [5] or [6], wherein the base matrix is a carrier for chromatography selected from a group consisting of a natural polymer carrier, a synthetic polymer carrier and an inorganic carrier.

[8] The packing material for liquid chromatography according to any one of the above [5] to [7], wherein the base matrix is porous particles, and the exclusion limit molecular weight thereof is at least 100,000 as calculated as pullulan.

[9] The packing material for liquid chromatography according to any one of the above [5] to [8], wherein the polysaccharide is a polysaccharide having a weight average molecular weight of at least 10,000 and having no anion-exchange groups, or its derivative.

[10] A process for producing the packing material for liquid chromatography as defined in any one of the above [1] to [4], which comprises activating the alcoholic hydroxy groups of the base matrix with 1,1-carbonylbis-1H-imidazole in an organic solvent, and then reacting them with the amino group of the ligand in an organic solvent or a water-containing organic solvent to introduce the ligand to the base matrix by an urethane bond.

[11] A process for producing the packing material for liquid chromatography as defined in any one of the above [1] to [4], which comprises introducing carboxyl groups to the base matrix, and then reacting them with the amino group of the ligand using a carbodiimide as a catalyst to introduce the ligand to the base matrix by an amide bond.

[12] A process for producing the packing material for liquid chromatography as defined in any one of the above [5] to [9], which comprises activating the alcoholic hydroxy groups of the base matrix and the alcoholic hydroxy groups of the spacer with 1,1-carbonylbis-1H-imidazole in an organic solvent, and then reacting them with the amino group of the ligand in an organic solvent or a water-containing organic solvent to introduce the ligand directly and via the spacer to the base matrix by an urethane bond.

[13] A process for producing the packing material for liquid chromatography as defined in any one of the above [5] to [9], which comprises introducing carboxyl groups to the base matrix and the spacer, and then reacting them with the amino group of the ligand using a carbodiimide as a catalyst to introduce the ligand directly and via the spacer to the base matrix by an amide bond.

[14] A process for separation and purification, or collection and recovery, of a biopolymer by liquid chromatography, which comprises adsorbing the biopolymer in an acidic aqueous solution with a pH of at most 5 by means of the packing material for liquid chromatography as defined in any one of the above [1] to [9], and then desorbing the adsorbed biopolymer under a neutral or weakly basic condition with a pH of at most 9.

Effects of the Invention

The packing material for liquid chromatography of the present invention has a ligand having a hydrophobic group and a carboxy group, immobilized to a hydrophilic base matrix, and is capable of adsorbing a biopolymer such as a protein or a peptide in an acidic aqueous solution and capable of desorbing the adsorbed biopolymer under a neutral to weakly basic condition, whereby such a biopolymer can be eluted and recovered depending upon the hydrophobicity and ionicity of such a biopolymer.

Further, in a case where the packing material for liquid chromatography of the present invention has the above ligand immobilized to a base matrix via a specific spacer (a synthetic polymer having alcoholic hydroxy groups, or a polysaccharide), it is possible to increase the binding capacity for a biopolymer such as a protein or a peptide, per unit volume of the packing material, as compared with the packing material wherein the ligand is not immobilized to the base matrix via such a spacer, whereby it is possible to separate and purify, or concentrate and recover, the biopolymer quickly and efficiently.

Further, the packing material for liquid chromatography of the present invention is a separating material capable of separating and purifying, or collecting and recovering, a biopolymer such as a protein or a peptide, by adsorbing and desorbing the biopolymer by a pH change without being influenced by the concentration of a salt in the solvent wherein the biopolymer such as a protein or a peptide is dissolved.

Further, by means of the process for separation and purification, or collection and recovery, of the present invention, it is possible to separate and purify, or concentrate and recover, a relatively unstable biopolymer such as a protein or a peptide from a large amount of dilute cell culture solution, readily and in a large amount by a rather compact installation. Specifically, it is possible to separate and purify, or concentrate or recover, a biopolymer such as a protein or a peptide by contacting a cell culture supernatant containing a salt at a concentration of physiological saline or higher, with the packing material of the present invention after only simple pretreatment such as pH adjustment.

BEST MODE FOR CARRYING OUT THE INVENTION

In the present invention, the first packing material for liquid chromatography is a packing material for liquid chromatography comprising a base matrix and a ligand immobilized to the base matrix, wherein (1) the base matrix is a hydrophilic base matrix having alcoholic hydroxy groups on its surface, (2) the ligand is at least one ligand selected from the group consisting of an α-amino acid represented by the following formula (1):

$$\text{RCH(NH}_2\text{)COOH} \tag{1}$$

wherein R is an aromatic group or a $C_{5-7}$ non-ionic aliphatic group, and an aminomethyl benzoic acid, (3) the ligand is immobilized to the base matrix by an amide bond or an urethane bond via the amino group contained in the compound represented by the formula (1), and (4) the amount of the ligand immobilized to the base matrix is at least 20 mmol per liter (wet volume) of the packing material for liquid chromatography.

Further, in the present invention, the second packing material for liquid chromatography is a packing material for liquid chromatography comprising a base matrix, a ligand immobilized directly to the base matrix and a ligand immobilized to the base matrix via a spacer, wherein (1) the base matrix is a hydrophilic base matrix having alcoholic hydroxy groups on its surface, (2) the spacer is a synthetic polymer having alcoholic hydroxy groups, or a polysaccharide, (3) the ligand is at least one ligand selected from the group consisting of an α-amino acid represented by the following formula (1):

$$\text{RCH(NH}_2\text{)COOH} \tag{1}$$

wherein R is an aromatic group or a $C_{5-7}$ non-ionic aliphatic group, and an aminomethyl benzoic acid, (4) the ligand immobilized directly to the base matrix, is immobilized to the base matrix by an amide bond or an urethane bond via the amino group contained in the compound represented by the formula (1), (5) the ligand immobilized to the base matrix via a spacer, is immobilized to the spacer by an amide bond or an urethane bond via the amino group contained in the compound represented by the formula (1), and (6) the amount of the ligand immobilized to the base matrix is at least 30 mmol per liter (wet volume) of the packing material for liquid chromatography.

Each of them is a packing material for liquid chromatography, wherein a ligand is immobilized to a base matrix, and they are common in that the base matrix is a hydrophilic base matrix having alcoholic hydroxy groups on its surface, the ligand is at least one ligand selected from the group consisting of an α-amino acid represented by the above formula (1) and an aminomethyl benzoic acid, and the ligand is immobilized to the base matrix by an amide bond or an urethane bond via the amino group contained in the compound represented by the formula (1).

The base matrix to be used for the packing material for liquid chromatography of the present invention is a hydrophilic base matrix having alcoholic hydroxy groups on its surface, and although it is not particularly limited, it may, for example, be a natural polymer carrier, a synthetic polymer carrier or an inorganic carrier, which is commonly used as a carrier for chromatography.

In the present invention, the natural polymer carrier may, for example, be a polysaccharide such as cellulose, agarose or dextran. The synthetic polymer carrier may, for example, be one prepared by mixing a hydroxy group-containing monomer such as 2-hydroxyethyl (meth)acrylate, 2-hydroxymethyl (meth)acrylate or hydroxypropyl (meth)acrylate with a crosslinkable monomer such as ethylene glycol di(meth) acrylate or divinylbenzene and polymerizing them in the presence of a polymerization initiator. The inorganic carrier may, for example, be silica or zeolite.

Further, in the present invention, the form of the base matrix may, for example, be spherical particles, non-spherical particles, a membrane or monolith (continuous body), but is not particularly limited.

In the present invention, among them, it is possible to suitably use a carrier for liquid chromatography useful as a packing material for size exclusion chromatography for a water-soluble polymer (such as a protein or peptide), which has alcoholic hydroxy groups on its surface.

Specifically, it is possible to suitably use one granulated by copolymerizing a monomer represented by a (meth)acrylate monomer or a (meth)acrylamide monomer, with a crosslinkable monomer [such as a (meth)acrylate packing material or a (meth)acrylamide packing material], one obtained by copolymerizing vinyl acetate with a crosslinking agent (a bifunctional or higher functional monomer) for granulation and then hydrolyzing the vinyl acetate monomer units, or one obtained by crosslinking a polysaccharide represented by e.g. agarose, dextran or cellulose (a polysaccharide packing material).

More particularly, the (meth)acrylate packing material may, for example, be particles of a copolymer of 2-hydroxyethyl (meth)acrylate with ethylene glycol di(meth)acrylate, or particles obtained by subjecting particles of a copolymer of glycidyl methacrylate with ethylene glycol di(meth)acrylate to ring-opening addition of the glycidyl group with water or a polyhydric alcohol.

Further, the (meth)acrylamide packing material may, for example, be particles of a copolymer of 2-hydroxyethyl (meth)acrylamide with N,N'-methylene di(meth)acrylamide.

Further, the polysaccharide packing material may, for example, be a packing material obtained by crosslinking a polysaccharide such as agarose, dextran or cellulose with e.g. an epihalohydrin or $C_{2-8}$ polymethylene dihalogen to crosslink hydroxy groups of the polysaccharide.

In the present invention, in order to secure a sufficient adsorption capacity as a packing material, it is preferred that the base matrix to be used is porous particles, and their pore size is larger than the molecular size of the water-soluble polymer to be treated (such as a protein or a peptide). In the case of the above-mentioned first packing material for liquid chromatography, the exclusion limit molecular weight of the base matrix is preferably at least 10,000 as calculated as pullulan. Further, in the case of the above second packing material for liquid chromatography, the exclusion limit molecular weight of the base matrix is preferably at least 100,000 as calculated as pullulan. In order to obtain a larger adsorption capacity, it is required that the effective surface area is sufficiently large. Extremely large pores or non-porous packing materials may also provide the function, but their effective surface area is small, and the adsorption capacity tends to be small.

Further, when liquid flowability is taken into consideration in order to let a sample solution and an eluent flow at a practical flow rate, the packing material is required to have a physical strength. In the case of a porous packing material, the degree of swelling with pure water is preferably at most 12.5 ml/g.

In the above-mentioned second packing material for liquid chromatography, the spacer is a synthetic polymer having alcoholic hydroxy groups, or a polysaccharide, and it is preferably one having no anion exchange groups. Specifically, it may, for example, be pullulan, dextran, hydroxyethyl cellulose, hydroxypropyl cellulose or carboxymethyl cellulose. If the molecular weight of such a spacer is too small, when it is immobilized to the inner wall of pores of the base matrix, it cannot fill in the pores, and the effect to increase the binding capacity of the biopolymer will be limited. On the other hand, if it is too large, it cannot enter into pores of the base matrix, and it can be immobilized only on the exterior surface of the base matrix, whereby the effect to increase the adsorption capacity will be very little. Accordingly, the weight average molecular weight of the spacer is preferably at least 10,000. The upper limit of the weight average molecular weight depends on the exclusion limit molecular weight of the base matrix. However, the molecular weight distribution of such a polymer is usually wide, and the upper limit of the weight average molecular weight is not particularly limited.

In the present invention, as a method for immobilizing a synthetic polymer having alcoholic hydroxy groups or a polysaccharide to the base matrix, a method may, for example, be mentioned wherein firstly an epihalohydrin or a polyglycidyl ether of a polyalcohol, and a base matrix, are subjected to addition and/or dehydrohalogenation in a strongly alkaline aqueous medium to have the base matrix epoxy-activated, and then, after washing off the remaining epihalohydrin or polyglyicidyl ether of a polyalcohol, a synthetic polymer having alcoholic hydroxy groups or a polysaccharide dissolved in water, is mixed thereto to carry out an addition reaction under a strongly alkaline condition for immobilizing.

In the above method, as the epihalohydrin, it is possible to use, for example, epichlorohydrin or epibromohydrin, and as the polyglycidyl ether of a polyalcohol, it is possible to use, for example, a polyglycidyl ether of e.g. ethylene glycol, butanediol, propylene glycol, glycerol, pentaerythritol, sorbitol or diglycerol.

In the present invention, the ligand is one having a hydrophobic group and a carboxy group. Specifically, it is an α-amino acid having a hydrophobic group, represented by the above formula (1), or an aminomethyl benzoic acid. As the α-amino acid having a hydrophobic group, an α-amino acid having an aromatic group, or an α-amino acid having a $C_{5-7}$ non-ionic aliphatic group will be a ligand which exhibits the function of the present invention. Specifically, the α-amino acid having an aromatic group may, for example, be phenylalanine or tryptophan. The α-amino acid having a non-ionic aliphatic group may specifically be, for example, leucine, norleucine or α-aminooctanoic acid. These α-amino acids have optical isomers, which exhibit the function of the present invention irrespective of L-isomers, D-isomers and racemates.

In the present invention, depending upon the type of the ligand to be used, there may be a case where if the ligand density is too high, the hydrophobicity tends to be so strong that the water-soluble polymer to be treated (such as a protein or a peptide) will be denatured when it is adsorbed, and its recovery rate tends to be low. In such a case, a neutral to acidic amino acid or a hydrophilic amine may be introduced together with the ligand of the present invention to adjust the hydrophobicity, although it does not function as a hydrophobic ligand.

The neutral to acidic amino acid may, for example, be glycine, alanine, β-alanine, proline, serine, threonine, asparagine, glutamine, aspartic acid, glutamic acid or tyrosine.

Further, the hydrophilic amine may, for example, be ethanolamine, 2-amino-(2-hydroxymethyl), or 1,3-propanediol.

In the present invention, a method for introducing such a ligand to the base matrix is required, as necessary conditions, that the ligand density can be made sufficiently high so that the protein or the like can be held by hydrophobic bonds and that anion exchange groups do not substantially coexist. That is, if anion exchange groups coexist in the obtained packing material, they dissociate into ions at an acidic pH to increase the hydrophilicity of the packing material and hinder hydrophobic interaction. The method for introducing a ligand in the present invention is not particularly limited, so long as it satisfies such conditions. As specific examples, the following two methods may be mentioned.

The first synthetic method is a process which comprises activating the alcoholic hydroxy groups of the base matrix with 1,1-carbonylbis-1H-imidazole (hereinafter referred to simply as CDI) in an organic solvent, and then reacting the activated groups with the amino group of the ligand in an organic solvent or a water-containing organic solvent to introduce the ligand to the base matrix by an urethane bond.

The second synthetic method is a process which comprises introducing carboxy groups to the base matrix, and then reacting them with the amino group of the ligand using a carbodiimide as a catalyst to introduce the ligand to the base matrix by an amide bond.

In the second synthetic method, the method for introducing carboxy groups to the base matrix is not particularly limited, and it may, for example, be a method of reacting a halogenated carboxylic acid to the alcoholic hydroxy groups of the base matrix under an alkaline condition, a method of adding a halohydrin under an alkaline condition to introduce epoxy groups, and reacting a mercapto carboxylic acid (such as mercapto acetic acid or mercapto propionic acid) under a neutral or weakly alkaline condition, or a method of adding an allyl glycidyl ether to introduce an allyl group, and reacting a mercapto carboxylic acid under an acidic condition.

Further, in the second synthetic method, as the carbodiimide, diisopropyl carbodiimide or dicyclohexyl carbodiimide may, for example, be used for an organic solvent system, or 1-ethyl-3-(3-dimethylaminopropyl)carbodiimide hydrochloride, or N-cyclohexyl-N'-(2-morpholinoethyl)carbodiimide-meso-p-toluenesulfonate may, for example, be used for an aqueous system or for a mixed system of water and an organic solvent. Further, at the time of activating carboxy groups with a carbodiimide after introducing the carboxy groups to the base matrix, a side reaction may be suppressed by reacting them with the ligand having an amino group by permitting N-hydroxysuccinic acid imide (hereinafter sometimes referred to simply as NHS) or 1-hydroxybenzotriazole to coexist.

Whereas, as reported by B. H. J. Hofstee et al. in Biochemical and Biophysical research communications, 63 (1975) p. 618-624 or by M. Kim et al. in Journal of Chromatography, 585 (1991) p.-45-51, it is already known to introduce a hydrophobic amino acid to the base matrix by a method other than the above-described methods. However, as reported by B. H. J. Hofstee et al., it is not possible to introduce a hydrophobic amine sufficiently by the cyanogen bromide-activating method, and it is not possible to adsorb a protein unless a highly concentrated solution is used as the eluent.

Further, it is possible to introduce an amino acid by a secondary amine bond after introducing an epoxy group or a formyl group to the base matrix. However, in such a method, amino groups will be ionized under an acidic condition, and both amino groups and carboxy groups are partially ionized under a neutral condition, and carboxy groups are ionized under a basic condition. Therefore, as disclosed in the above-mentioned report by M. Kim et al., with an eluent having a low ionic strength, it is possible to adsorb a protein by an electrostatic interaction, but a hydrophobic interaction does not work strongly, and the protein will be released as the ionic strength of the eluent is increased. Therefore, such a method for introducing a ligand wherein anion exchange groups are formed by immobilizing the ligand, cannot be adopted in the present invention. In the present invention, the amount of the ligand immobilized to the base matrix is usually at least 20 mmol per liter (wet volume) of the above-mentioned first packing material for liquid chromatography, or usually at least 30 mmol per liter (wet volume) of the above-mentioned second packing material for liquid chromatography.

The packing material for liquid chromatography of the present invention obtained by the above-described synthetic methods will be a packing material wherein a ligand having a hydrophobic group and a carboxy group, is immobilized to a base matrix.

Further, by immobilizing a spacer to the base matrix by the above-described method and by immobilizing a ligand to the base matrix by the above-described synthetic methods, it is possible to obtain a packing material for liquid chromatography having a ligand immobilized directly to the base matrix and a ligand immobilized to the base matrix via the spacer.

For example, by activating alcoholic hydroxy groups of the base matrix and alcoholic hydroxy groups of the spacer with 1,1-carbonylbis-1H-imidazole in an organic solvent, and then reacting the activated groups with the amino group of the ligand in an organic solvent or a water-containing solvent to introduce the ligand directly to the base matrix and via the spacer to the base matrix by an urethane bond, or by introducing carboxy groups to the base matrix and the spacer, and then reacting them with the amino group of the ligand using a carbodiimide as a catalyst to introduce the ligand directly to the base matrix and via the spacer to the base matrix by an amide bond, it is possible to obtain the second packing material for liquid chromatography.

Further, in the packing material thus obtained, the ligand immobilized directly to the base matrix, is immobilized to the base matrix by an amide bond or an urethane bond via the amino group contained in the compound represented by the formula (1), and the ligand immobilized to the base matrix via a spacer, is immobilized to the spacer by an amide bond or an urethane bond via the amino group contained in the compound represented by the formula (1).

If the packing material for liquid chromatography of the present invention is packed in a liquid chromatography column and an eluent with a pH of at most 5 (the pH is preferably from 3 to 5), is permitted to flow, the pH of inside column decreases and ionization of the carboxy groups is reduced, whereby the hydrophobicity of the surface of the packing material increases. At this point, if the packing material is contacted with a sample solution wherein a solute having a hydrophobic surface (such as a protein or a peptide) is dissolved, the solute is adsorbed to the packing material. Further, in the present invention, it is preferred to add an acid or an alkali to the sample solution to make it an acidic solution with a pH of at most 5.

Then, after washing a non-adsorbed component with an eluent having the same pH as the above eluent, if the pH of the eluent is gradually increased, ionization (ratio of ionization) of the carboxy groups in the packing material increases, and the hydrophobicity of surface of the packing material tends to inversely decrease. After that, under a neutral or a weak basic condition of at most pH 9, the adsorbed solute will desorb and elute from the packing material depending upon the surface hydrophobicity.

Thus, in the present invention, it is possible to elute and recover each solute by separation and purification based on the hydrophobicity and ionicity of the solute by weakening hydrophobic interaction between the solute and the packing material. Further, if the pH of the eluent is abruptly increased to a neutral or weakly basic condition at this point, it is also possible to elute and recover the adsorbed solute in the form of a concentrated solution.

EXAMPLES

Now, the present invention will be described in further detail with reference to Examples, but it should be understood that the present invention is by no means restricted thereto. Further, each of the base matrices used in the following Examples and Comparative Examples is a carrier having alcoholic hydroxy groups on its surface (hydrophilic base matrix). The properties of the base matrix relating to the porous structure in the aqueous condition were evaluated by the exclusion limit molecular weight and porosity. The measuring method is as follows.

Measurement of Exclusion Limit Molecular Weight and Porosity:

By using a gel slurry aqueous solution of a hydrophilic base matrix, the base matrix was put into a stainless steel column having an inner diameter of 10.7 mm and a length of 150 mm with the highest packing density. Then, the packed column was mounted on HPLC system (manufactured by TOSOH CORPORATION) equipped with RI-8020 detector (manufactured by TOSOH CORPORATION).

Then, by using dextran with a molecular weight of 40,000,000, pullulan and polyethylene glycol with the respective molecular weights shown in Table 1 as standard substances, the standard substances with various molecular weights were introduced at a flow rate of 0.5 ml/min, and from the elution amounts, the exclusion limit molecular weights were obtained. Further, the porosity was obtained from the elution amounts of dextran and ethylene glycol and the column volume.

The hydrophilic base matrices used for measurement are 5 packing materials i.e. polymethacrylate porous packing materials [TOYOPEARL HW-65C, HW-60C, HW-55C and HW-50C (manufactured by TOSOH CORPORATION)], a crosslinked agarose packing material [Sepharose 6-Fast Flow (manufactured by GE Healthcare)], and a crosslinked dextran packing material [Sephadex G-25 (manufactured by GE Healthcare)]. The obtained results are shown in Table 1.

TABLE 1

| Base matrix | Exclusion limit molecular weight | Standard polymer | Porosity (%) |
|---|---|---|---|
| HW65C | 2,100,000 | Pullulan | 75 |
| HW60C | 600,000 | Pullulan | 74 |
| HW50C | 10,000 | Pullulan | 78 |
| Sepharose 6FF | 400,000 | Pullulan | 90 |
| Sephadex G25 | 3,000 | PEG [1] | 70 |

[1] PEG: Polyethylene glycol

Production Example 1

The polymethacrylate porous packing material [TOYOPEARL HW-60C (manufactured by TOSOH CORPORATION)] having alcoholic hydroxy groups on its surface was repeatedly suspended and filtrated by dioxane solvent on a glass filter to remove water content, and the dispersion solvent of such a packing material slurry was removed by suction filtration to prepare a suction dry-gel cake.

50 g of the gel cake and 100 ml of dioxane were added into a 300 ml separable flask and stirred. 60 mmol of the CDI was dissolved in 30 g of dioxane, and the CDI solution was dropwise added to the separable flask at a constant temperature of 30° C. After the dropwise addition, stirring was continued for 1 hour. Then, the slurry was filtrated by a glass filter, and the gel was washed with dioxane solvent to remove unreacted CDI or by-products, thereby a CDI activated suction dry-gel cake was synthesized.

The entire amount of the obtained gel cake was added again to a 300 ml separable flask and 100 ml of dimethylformamide (hereinafter referred to as DMF) was added, followed by stirring. 24 mmol of L-phenylalanine and 6 mmol of glycine were dissolved in 25 ml of an aqueous solution containing 1 mol/liter of sodium hydroxide, and 50 ml of DMF was added and mixed. This amino acid solution was put into the above separable flask all at once and stirred to carry out the reaction for 16 hours at room temperature.

After completion of the reaction, the obtained gel was washed again on a glass filter by DMF, 50% of acetone, 0.1 mol/liter of sodium hydroxide solution and pure water in this order. The gel obtained from this reaction is referred to as packing material 1.

Measurement of Ion Exchange Capacity:

10 g of the washed packing material 1 (suction dry-gel cake) was suspended in 15 ml of pure water, and poured into a glass column having an inner diameter of 20 mm and equipped with a glass filter, and the solvent was removed by suction filtration. From the formed bed (sedimented portion of the packing material in the column), a portion exceeding 10 ml of the packing material was removed (i.e. the packing material in the column became 10 ml), followed by washing twice with 30 ml of 0.5 mol/liter hydrochloric acid. Thereafter washing was repeated with 40 ml of pure water until the pH of the filtrate became 5 or higher. The washed packing material was taken out and transferred to a 200 ml beaker, and then suspended in 100 ml of 0.5 mol/liter sodium chloride solution and titrated with a 0.5 mol/liter sodium hydroxide solution by using an automatic titration device (COM-450, manufactured by Hiranuma Sangyo Corporation). The end point was pH 8.5. The ion exchange capacity calculated from the titration liquid volume till the end point was 125 milli-equivalent/liter. The total ligand amount of phenylalanine and glycine to the packing material 1 corresponds to the ion exchange capacity of the packing material 1 and is 125 mmol/liter.

Production Example 2

A CDI activated suction dry-gel cake was synthesized in the same manner as in Production Example 1. The entire amount of the obtained gel cake was added to a 300 ml separable flask again, and 100 ml of DMF was added, followed by stirring. 24 mmol of DL-phenylalanine and 6 mmol of ethanolamine were dissolved in 25 ml of a 1 mol/liter sodium hydroxide aqueous solution, and 50 ml of DMF was added and mixed. This amino acid solution was put into a separable flask all at once and stirred to carry out the reaction for 16 hours at room temperature.

After completion of the reaction, the obtained gel was washed again on a glass filter by DMF, 50% acetone, 0.1 mol/liter sodium hydroxide solution and pure water in this order. The gel obtained from this reaction is referred to as packing material 2. Its ion exchange capacity was measured in the same manner as in Production Example 1 and was found to be 80 milli-equivalent/liter. The introduction amount of phenylalanine-ligand to the packing material 2 corresponds to the ion exchange capacity of the packing material 2 and is 80 mmol/liter.

Production Example 3

A CDI activated suction dry-gel cake was synthesized in the same manner as in Production Example 1. The entire amount of the obtained gel cake was added to a 300 ml separable flask again, and 100 ml DMF was added, followed by stirring. 30 mmol of 4-aminomethylbenzoic acid was dissolved in 25 ml of a 1 mol/liter sodium hydroxide aqueous solution, and 50 ml of DMF was added and mixed. This amino acid solution was put into a separable flask all at once and stirred to carry out the reaction for 16 hours at room temperature.

After completion of the reaction, the obtained gel was washed again on a glass filter by DMF, 50% acetone, 0.1 mol/liter sodium hydroxide solution and pure water in this order. The gel obtained from this reaction is referred to as packing material 3. Its ion exchange capacity was measured in the same manner as in Production Example 1 and was found to be 105 milli-equivalent/liter. The introduction amount of 4-aminomethylbenzoic acid-ligand to the packing material 3 corresponds to the ion exchange capacity of the packing material 3 and is 105 mmol/liter.

Production Example 4

A CDI activated suction dry-gel cake was synthesized in the same manner as in Production Example 1. The entire amount of the obtained gel cake was added to a 300 ml separable flask again, and 100 ml of DMF was added, followed by stirring. 30 mmol of L-leucine was dissolved in 25 ml of a 1 mol/liter sodium hydroxide aqueous solution, and 50 ml of DMF was added and mixed. This amino acid solution was put into a separable flask all at once and stirred to carry out the reaction for 16 hours at room temperature.

After completion of the reaction, the obtained gel was washed again on a glass filter by DMF, 50% acetone, 0.1 mol/liter sodium hydroxide solution and pure water in this order. The gel obtained from this reaction is referred to as packing material 4. Its ion exchange capacity was measured in the same manner as in Production Example 1 and was found to be 110 milli-equivalent/liter. The introduction amount of leucine-ligand to the packing material 4 corresponds to the ion exchange capacity of the packing material 4 and is 110 mmol/liter.

Production Example 5

The cross-linked agarose packing material [Sepharose 6-Fast Flow (manufactured by GE Healthcare)], was repeatedly suspended and filtrated by dioxane solvent on a glass filter to remove water content, and the dispersion solvent of such a packing material slurry was removed by suction filtration to prepare a suction dry-gel cake.

50 g of the gel cake was reacted and treated in the same manner as in Production Example 1 to obtain packing material 5. Its ion exchange capacity was measured in the same manner as in Production Example 1 and was found to be 100 milli-equivalent/liter. The total ligand amount of phenylalanine and glycine to the packing material 5 corresponds to the ion exchange capacity of the packing material 5 and is 100 mmol/liter.

Production Example 6

The polymethacrylate porous packing material [TOYOPEARL HW-65C (manufactured by TOSOH CORPORATION)] having alcoholic hydroxy groups on its surface was repeatedly suspended and filtrated by dioxane solvent on a glass filter to remove water content, and the dispersion solvent of such a packing material slurry was removed by suction filtration to prepare a suction dry-gel cake.

50 g of the gel cake was reacted and treated in the same manner as in Production Example 1 to obtain packing material 6. Its ion exchange capacity was measured in the same manner as in Production Example 1 and was found to be 80 milli-equivalent/liter. The total ligand amount of phenylalanine and glycine to the packing material 6 corresponds to the ion exchange capacity of the packing material 6 and is 80 mmol/liter.

Production Example 7

The polymethacrylate porous packing material [TOYOPEARL HW-50C (manufactured by TOSOH CORPORATION)] having alcoholic hydroxy groups on its surface was repeatedly suspended and filtrated by dioxane solvent on a glass filter to remove water content, and the dispersion solvent of such a packing material slurry was removed by suction filtration to prepare a suction dry-gel cake.

50 g of the gel cake was reacted and treated in the same manner as in Production Example 1 to obtain packing material 7. Its ion exchange capacity was measured in the same manner as in Production Example 1 and was found to be 185 milli-equivalent/liter. The total ligand amount of phenylalanine and glycine to the packing material 7 corresponds to the ion exchange capacity of the packing material 7 and is 185 mmol/liter.

Production Example 8

The cross-linked dextran packing material [Sephadex G-25 (manufactured by GE Healthcare)], was repeatedly suspended and filtrated by dimethylsulfoxide (hereinafter referred to as DMSO) solvent on a glass filter to remove water content, and the dispersion solvent of such a packing material slurry was removed by suction filtration to prepare a suction dry-gel cake.

50 g of the gel cake and 100 ml of DMSO were added to a 300 ml separable flask, followed by stirring. 60 mmol of CDI was dissolved in 30 g of dioxane, and the CDI solution was dropwise added to the separable flask at a constant temperature of 30° C. After the dropwise addition, stirring was continued for 1 hour. Then, the slurry was filtrated by a glass filter, and the gel was washed with DMSO solvent to remove unreacted CDI or by-products, thereby a CDI activated suction dry-gel cake was synthesized.

The entire amount of the obtained gel cake was added again to a 300 ml separable flask and 100 ml of DMSO was added, followed by stirring. 24 mmol of L-phenylalanine and 6 mmol of glycine were dissolved in 25 ml of an aqueous solution containing 1 mol/liter of sodium hydroxide, and 50 ml of DMSO was added and mixed. This amino acid solution was put into the above separable flask all at once and stirred and reacted for 16 hours at room temperature.

After completion of the reaction, the obtained gel was washed again on a glass filter by DMSO, 50% acetone, 0.1 mol/liter sodium hydroxide solution and pure water in this order. The gel obtained from this reaction is referred to as packing material 8. Its ion exchange capacity was measured in the same manner as in Production Example 1 and was found to be 160 milli-equivalent/liter. The total ligand amount of phenylalanine and glycine to the packing material 8 corresponds to the ion exchange capacity of the packing material 8 and is 160 mmol/liter.

The base matrix, activating agent, ligand and ion exchange capacity of each of the packing materials prepared by Production Examples 1 to 8 are shown in Table 2.

TABLE 2

| Packing material | Production Example | Base matrix | Activating agent | Ligand[1] (molar ratio) | Ion exchange capacity meq/l | Protein elution amount (ml) STI | BSA | IgG | CHY | BSA adsorption amount mg/ml | Recovery rate (%) |
|---|---|---|---|---|---|---|---|---|---|---|---|
| 1 | 1 | HW60C | CDI | L-Phe:Gly (8/2) | 125 | 20.9 | 37.3 | 38.7 | 42.9 | 60 | 95 |
| 2 | 2 | HW60C | CDI | DL-Phe:EA (8/2) | 80 | 27.0 | 40.1 | 40.5 | 42.3 | 57 | 95 |
| 3 | 3 | HW60C | CDI | 4-AMBA | 105 | 50.0 | 50.0 | 50.0 | 50.2 | 55 | 97 |
| 4 | 4 | HW60C | CDI | L-Leu | 110 | 6.0 | 36.4 | 30.7 | 24.6 | 57 | 94 |
| 5 | 5 | Sepharose 6FF | CDI | L-Phe:Gly (8/2) | 100 | 18.5 | 34.5 | 34.0 | 41.2 | 58 | 95 |
| 6 | 6 | HW65C | CDI | L-Phe:Gly (8/2) | 80 | 18.0 | 33.8 | 33.0 | 40.6 | 34 | 95 |

TABLE 2-continued

| Packing material | Production Example | Base matrix | Activating agent | Ligand[1] (molar ratio) | Ion exchange capacity meq/l | Protein elution amount (ml) | | | | BSA adsorption amount | |
|---|---|---|---|---|---|---|---|---|---|---|---|
| | | | | | | STI | BSA | IgG | CHY | mg/ml | Recovery rate (%) |
| 7 | 7 | HW50C | CDI | L-Phe:Gly (8/2) | 185 | 21.0 | 34.2 | 31.5 | 40.6 | 24 | 92 |
| 8 | 8 | Sephadex G25 | CDI | L-Phe:Gly (8/2) | 160 | 13.0 | 25.5 | 21.4 | 25.4 | 5 | 90 |

[1]EA: Ethanolamine, 4-AMBA: 4-amnomethyl benzoic acid, L-Leu: L-leucine

Production Example 9

TOYOPEARL HW-60C (manufactured by TOSOH CORPORATION) as used also in the Production Example 1 was repeatedly suspended and filtrated by pure water on a glass filter for pure water displacement, and then the dispersion solvent of such a packing material slurry was removed by suction filtration to prepare a suction dry-gel cake.

120 of the gel cake, 0.8 mol of sodium chloroacetate and 140 ml of pure water were added into a 500 ml separable flask, and with stirring, a 48% sodium hydroxide aqueous solution was dropwise added in an amount corresponding to 1.6 moles of sodium hydroxide to the separable flask over a period of 1 hour at a reaction temperature of 50° C. After the dropwise addition, the reaction was continued for 1 hour, and the obtained gel was washed by pure water. The gel having carboxymethyl groups as ion exchange groups, obtained by this reaction, is referred to as CM ion exchange packing material 1 (CM is an abbreviation for carboxymethyl). The ion exchange capacity was measured in the same manner as in Production Example 1 and was found to be 155 milli-equivalent/liter.

Measurement of Swelling Degree:

The CM ion exchange packing material 1 was washed twice by 30 ml of 0.5 mol/liter sodium hydroxide, and then washing was repeated with 40 ml of pure water until the pH of the filtrate became 8.5 or lower. 10 g of the washed packing material (suction dry-gel cake) was suspended in 15 ml of pure water, and poured into a glass column having an inner diameter of 20 mm and equipped with a glass filter, and the solvent was removed by suction filtration. From the formed bed, a portion exceeding 10 ml of the packing material was removed, and then 10 ml of the remaining packing material was transferred to a glass filter, followed by washing it twice with 30 ml of 0.5 mol/liter hydrochloric acid. Thereafter, washing of the packing material was repeated with 40 ml of pure water until the pH of the filtrate became 5 or higher. After washing twice with 40 ml of acetone, the washed packing material was taken out and dried under reduced pressure at 40° C., and the weight of 10 ml of the packing material was measured to calculate the swelling degree [swelling degree (ml/g)=volume (ml)/weight (g)]. The swelling degree of this packing material was 5.2 ml/g.

Further, using the dried packing material as a sample for elemental analysis, nitrogen weight percent was measured by means of CHN automatic analyzer (240011, manufactured by Perkin Elmer). In Production 10 and subsequent Production Examples, an elemental analysis of dried packing material was conducted in the same manner.

Production Example 10

60 g of the CM ion exchange packing material 1 synthesized in Production Example 9 was washed on a glass filter by 0.5 mol/liter hydrochloric acid and then by pure water until the filtrate became neutral. Further, suspension and filtration by dioxane solvent were repeated to remove water content, and the dispersion solvent of such a packing material slurry was removed by suction filtration to prepare a suction dry-gel cake.

60 g of the gel cake and 150 ml of dioxane were added into a 300 ml separable flask, and then 30 mmol of N-hydroxysuccinimide (hereinafter referred to simply as NHS) and 30 mmol of diisopropylcarbodiimide (hereinafter referred to simply as DIC) were added, followed by stirring. The stirring was continued for 4 hours at 30° C., and then the slurry was filtrated by a glass filter. The obtained gel was washed with dioxane solvent to remove unreacted materials or by-products, thereby obtain 63.5 g of a dioxane-suction dry-gel cake. The gel cake obtained from this reaction is referred to as NHS activated packing material 1.

20 g of the NHS activated packing material 1 was taken and added to a 100 ml separable flask, and then 20 ml of dioxane, 40 ml of a 0.1 mol/liter phosphate buffer (pH 6.9) and 12 mmol of L-tryptophan were added, followed by stirring. After the reaction for 16 hours at 25° C., the reaction solution was filtrated and removed, and then the obtained gel was washed by 50% acetone, 0.1 mol/liter hydrochloric acid, pure water and 0.1 mol/liter sodium hydroxide in this order to remove unreacted materials or by-products. The packing material obtained from this reaction is referred to as packing material 9. The ion exchange capacity of the packing material 9 was measured in the same manner as in Production Example 1 and was found to be 148 milli-equivalent/liter. Further, the swelling degree of the packing material 9 was measured in the same manner as in Production Example 9 and was found to be 4.8 ml/g.

Production Example 11

20 g of the NHS activated packing material 1 synthesized in Production Example 10 was taken and added to a 100 ml separable flask, and then 20 ml of dioxane, 40 ml of a 0.1 mol/liter phosphate buffer (pH 6.9) and 12 mmol of L-phenylalanine were added, followed by stirring. After the reaction for 16 hours at 25° C., the reaction solution was filtrated and removed, and then the obtained gel was washed by 50% acetone, 0.1 mol/liter hydrochloric acid, pure water, 0.1 mol/liter sodium hydroxide and pure water in this order to remove unreacted materials or by-products. The gel obtained from this reaction is referred to as packing material 10. Its ion exchange capacity was measured in the same manner as in Production Example 1 and was found to be 148 milli-equivalent/liter. Further, its swelling degree was measured in the same manner as in Production Example 9 and was found to be 4.8 ml/g.

Production Example 12

20 g of the NHS activated packing material 1 synthesized in Production Example 10 was taken and added to a 100 ml separable flask, and then 20 ml of dioxane, 40 ml of a 0.1 mol/liter phosphate buffer (pH 6.9) and 12 mmol of α-aminooctanoic acid were added, followed by stirring. After the reaction for 16 hours at 25° C., the reaction solution was filtrated and removed, and then the obtained gel was washed by 50% acetone, 0.1 mol/liter hydrochloric acid, pure water and 0.1 mol/liter sodium hydroxide in this order to remove unreacted materials or by-products. The gel obtained from this reaction is referred to as packing material 11. Its ion exchange capacity was measured in the same manner as in Production Example 1 and was found to be 148 milli-equivalent/liter. Further, its swelling degree was measured in the same manner as in Production Example 9 and was found to be 4.8 ml/g.

Production Example 13

30 g (corresponding to 35 ml) of the CM ion exchange packing material 1 synthesized in Production Example 9 and 35 ml of pure water were added to a 300 ml separable flask, and 0.5 mol/liter hydrochloric acid was gradually added to adjust the pH to 4.8. Then, 30 ml of dioxane and 10.9 mmol of NHS were added to the separable flask, followed by stirring and mixing to dissolve NHS. 10.9 mmol of 1-ethyl-3-(3-dimethylaminopropyl)carbodiimide hydrochloride (hereinafter referred to simply as EDC) was dissolved in 3.5 ml of pure water and then added to the separable flask at 25° C., and stirring was continued for 2 hours for reaction. The reaction solution was removed by filtration, and then the obtained gel was washed with pure water and dioxane in this order, to remove unreacted materials or by-products and suction-filtrated to obtain 31.5 g of dioxane-suction dry-gel cake. The obtained gel cake is referred to as NHS activated packing material 2.

20 g of the NHS activated packing material 2 was taken and added to a 100 ml separable flask, and then 20 ml of dioxane, 40 ml of a 0.1 mol/liter phosphate buffer (pH 6.9) and 12 mmol of 4-aminomethylbenzoic acid were added, followed by stirring. After the reaction for 16 hours at 25° C., the reaction solution was filtrated and removed, and then the obtained gel was washed by 50% acetone, 0.1 mol/liter hydrochloric acid and pure water in this order to remove unreacted materials or by-products. The gel obtained from this reaction is referred to as packing material 12. The ion exchange capacity of the packing material 12 was measured in the same manner as in Production Example 1 and was found to be 146 milli-equivalent/liter. Further, the swelling degree of the packing material 12 was measured in the same manner as in Production Example 9 and was found to be 4.8 ml/g.

Production Example 14

TOYOPEARL HW-65C (manufactured by TOSOH CORPORATION) as used also in the Production Example 6 was repeatedly suspended and filtrated with pure water on a glass filter for pure water displacement, and then suction filtrated to prepare a suction dry-gel cake.

90 g of the gel cake, 0.6 mol of sodium chloroacetate and 140 ml of pure water were added into a 300 ml separable flask, and with stirring, a 48% sodium hydroxide aqueous solution was dropwise added over a period of 1 hour at a reaction temperature of 50° C. (corresponding to 1.2 moles of sodium hydroxide). After the dropwise addition, the reaction was continued for 1 hour, and the obtained gel was washed by pure water. The gel obtained from this reaction is referred to as CM ion exchange packing material 2. Its ion exchange capacity was measured in the same manner as in Production Example 1 and was found to be 115 milli-equivalent/liter. Further, its swelling degree was measured in the same manner as in Production Example 9 and was found to be 5.0 ml/g.

Production Example 15

20 g (corresponding to 25 ml) of the CM ion exchange packing material 2 synthesized in Production Example 14 and 45 ml of pure water were added into a 100 ml separable flask, and 0.5 mol/liter hydrochloric acid was gradually added to adjust the pH to 5.0. Then, 25 ml of dioxane, 5.7 mmol of NHS and 2.85 mmol of L-tryptophan were added into the separable flask, and then stirred, mixed and dissolved. 5.3 mmol of EDC was dissolved in 2.5 ml of pure water and added to the separable flask at 40° C., and stirring was continued for 6 hours to carry out the reaction. The reaction solution was removed by filtration, and the obtained gel was washed by 50% acetone, 0.1 mol/liter sodium hydroxide and pure water in this order, to remove unreacted materials or by-products. The gel obtained from this reaction is referred to as packing material 13. Its ion exchange capacity was measured in the same manner as in Production Example 1 and was found to be 108 milli-equivalent/liter. Further, its swelling degree was measured in the same manner as in Production Example 9 and was found to be 4.8 ml/g.

Production Example 16

20 g (corresponding to 25 ml) of the CM ion exchange packing material 2 synthesized in Production Example 14 and 45 ml of pure water were added into a 100 ml separable flask, and 0.5 mol/liter hydrochloric acid was gradually added to adjust the pH to 5.0. Then, 25 ml of dioxane, 5.7 mmol of NHS and 2.85 mmol of L-tryptophan were added into the separable flask, and then stirred, mixed and dissolved. 3.8 mmol of EDC was dissolved in 2.5 ml of pure water and added to the separable flask at 40° C., and stirring was continued for 6 hours to carry out the reaction. The reaction solution was removed by filtration and the obtained gel was washed by 50% acetone, 0.1 mol/liter sodium hydroxide and pure water in this order, to remove unreacted materials or by-products. The gel obtained from this reaction is referred to as packing material 14. Its ion exchange capacity was measured in the same manner as in Production Example 1 and was found to be 108 milli-equivalent/liter. Further, its swelling degree was measured in the same manner as in Production Example 9 and was found to be 4.8 ml/g.

Production Example 17

The ion exchange capacity of the cross-linked agarose weak cation exchange gel [CM—Sepharose Fast Flow (manufactured by GE Healthcare)] was measured in a same manner as in Production Example 1 and was found to be 105 milli-equivalent/liter.

The cross-linked agarose weak cation exchange gel was repeatedly suspended and filtrated by pure water on a glass filter for pure water displacement and then suction filtrated to prepare a suction dry-gel cake.

17 g (corresponding to 20 ml) of the gel cake and 36 ml of pure water were added into a 100 ml separable flask, and 0.5 mol/liter hydrochloric acid was gradually added to adjust the pH to 5.0. Then, 20 ml of dioxane, 4.2 mmol of NHS and 2.1 mmol of DL-phenylalanine were added into the separable flask, and then stirred, mixed and dissolved. 4.2 mmol of EDC was dissolved in 2 ml of pure water and added to the separable flask at 25° C., and stirring was continued for 16 hours to carry out the reaction. The reaction solution was removed by filtration on a glass filter, and the obtained gel was washed by 50% acetone, 0.1 mol/liter sodium hydroxide and pure water in this order, to remove unreacted materials or by-products. The gel obtained from this reaction is referred to as packing material 15. Its ion exchange capacity was measured in the same manner as in Production Example 1 and was found to be 98 milli-equivalent/liter. Further, its swelling degree was measured in the same manner as in Production Example 9 and was found to be 10.6 ml/g.

Production Example 18

TOYOPEARL HW-65C (manufactured by TOSOH CORPORATION) as used also in Production Example 6 was repeatedly suspended and filtrated by pure water on a glass filter for pure water displacement and then suction filtrated to prepare a suction dry-gel cake.

60 g of the gel cake, 100 g of pure water and 0.4 mol of epichlorohydrin were added into a 300 ml separable flask, and stirred and mixed to bring the temperature to 45° C. While stirring and maintaining the reaction temperature at 45° C., 0.38 mol of 48% sodium hydroxide was dropwise added over a period of 2 hours to the separable flask, and after completion of the dropwise addition, stirring was continued for 2 hours to carry out the reaction. The reaction mixture was filtrated by a glass filter, unreacted materials or by-products were washed off by pure water to obtain 31.2 g of a suction dry-gel cake for an epoxy activated packing material.

30 g of the suction dry-gel cake for an epoxy activated packing material, 25 mmol of DL-phenylalanine, 40 ml of pure water, 20 ml of dioxane and 10 mmol of sodium carbonate were added into a 100 ml separable flask, and stirred while maintaining the reaction temperature at 25° C. to carry out the reaction for 16 hours. The reaction mixture was filtrated by a glass filter, and unreacted materials or by-products were washed off by 50% dioxane, 0.1 mol/liter hydrochloric acid, pure water, 0.1 mol/liter sodium hydroxide and pure water in this order to obtain a packing material wherein DL-phenylalanine was introduced by a secondary amino bond. This packing material is referred to as packing material 16. Further, its swelling degree was measured in the same manner as in Production Example 9 and was found to be 4.7 ml/g.

Production Example 19

30 g of the suction dry-gel cake for an epoxy activated packing material synthesized in Production Example 18, 90 ml of pure water and 10 ml of 0.1 mol/liter hydrochloric acid were added into a 300 ml separable flask and while maintaining the reaction temperature at 80° C. with stirring, reacted for 4 hours to convert epoxy groups to diol groups by ring-opening. This diol packing material was washed by pure water, and then the total amount of the washed diol packing material, 50 ml of pure water and 13 mmol of sodium periodate were added into a 100 ml separable flask and while maintaining the reaction temperature at 40° C. with stirring, reacted for 1.5 hours to formylate diol groups, followed by washing by pure water to obtain a formylated packing material. The entire amount of the formylated packing material, 30 mmol of DL-phenylalanine, 60 ml of pure water and 30 ml of dioxane were added into a 300 ml of separable flask, stirred and dissolved at 25° C. of reaction temperature, followed by cooling to 5 to 10° C. 40 mmol of sodium borohydride was dissolved in 12 ml of pure water and then dropwise added for 30 minutes to the separable flask. After the reaction for 1 hour, the temperature was raised to 25° C., and the reaction was carried out for further 30 minutes. The reaction mixture was filtrated by a glass filter, and unreacted materials or by-products were washed-off by 50% dioxane, 0.1 mol/liter hydrochloric acid, pure water, 0.1 mol/liter sodium hydroxide and pure water in this order to obtain a packing material wherein DL-phenylalanine was introduced by a secondary amino bond. This packing material is referred to as packing material 17. Further, its swelling degree was measured in the same manner as in Production Example 9 and was found to be 4.8 ml/g.

The base matrix, activating agent, ligand, ion exchange capacity and elemental analysis result of each of the packing materials prepared in Production Examples 9 to 19 are shown in Table 3 together.

TABLE 3

| Packing material | Production Example | Base matrix | Activating agent | Ligand[1] | Ion exchange capacity meq/l | Elemental analysis Nitrogen % | Protein elution amount (ml) STI | BSA | IgG | CHY | BSA adsorption amount mg/ml | Recovery rate (%) |
|---|---|---|---|---|---|---|---|---|---|---|---|---|
| CM-1 | 9 | HW60C | | CM | 155 | <0.3 | 2.8 | 2.8 | 5.8 | 5.3 | <2 | Not measurable |
| 9 | 10 | Production Example 9 | DIC | L-Trp | 148 | 0.8 | 25.5 | 3.9 | 39.3 | 41.8 | 60 | 95 |
| 10 | 11 | Production Example 9 | DIC | L-Phe | 148 | 0.4 | 21.0 | 36.2 | 37.1 | 40.2 | 59 | 95 |
| 11 | 12 | Production Example 9 | DIC | ACA | 148 | 0.4 | 8.5 | 42.6 | 33.4 | 29.3 | 60 | 93 |
| 12 | 13 | Production Example 9 | EDC | 4-AMBA | 146 | 0.4 | 48.0 | 48.0 | 48.0 | 48.1 | 60 | 96 |
| CM-2 | 14 | HW65C | | CM | 115 | <0.3 | 2.8 | 2.8 | 5.5 | 4.6 | <2 | Not measurable |
| 13 | 15 | Production Example 14 | EDC | L-Trp | 108 | 0.5 | 28.0 | 38.0 | 38.2 | 40.6 | 32 | 95 |
| 14 | 16 | Production Example 14 | EDC | L-Trp | 115 | 0.5 | 3.4 | 21.3 | 20.8 | 14.3 | 28 | 96 |
| 15 | 17 | CM-Sepharose FF | EDC | DL-Phe | 98 | 0.4 | 18.0 | 33.5 | 29.6 | 24.0 | 56 | 95 |

TABLE 3-continued

| Packing material | Production Example | Base matrix | Activating agent | Ligand[1] | Ion exchange capacity meq/l | Elemental analysis Nitrogen % | Protein elution amount (ml) STI | BSA | IgG | CHY | BSA adsorption amount mg/ml | Recovery rate (%) |
|---|---|---|---|---|---|---|---|---|---|---|---|---|
| 16 | 18 | HW65C | ECH | DL-Phe | Not measurable | 0.6 | 2.9 | 2.9 | 5.7 | 4.9 | <2 | Not measurable |
| 17 | 19 | HW65C | formyl | DL-Phe | Not measurable | 0.4 | 2.9 | 2.9 | 5.6 | 4.8 | <2 | Not measurable |

[1] CM: Carboxymethyl, L-Trp: L-tryptophan, L-Phe: L-phenylalanine, ACA: α-aminooctanoic acid, 4-AMBA: 4-aminomethyl benzoic acid Example 1

With respect to packing materials 1 to 4 prepared in Production Examples 1 to 4, the main peak elution time and BSA adsorption amount of each protein sample were measured for each of the packing materials. The obtained results are shown in Table 2.

Further, the protein adsorption and elution by a pH gradient elution method, and the measurement of the RSA adsorption amount and recovery rate were conducted as follows.

(1) Protein Adsorption and Elution by pH Gradient Elution Method:

The packing materials shown in Table 2 were packed respectively to 75 mm stainless steel columns each having an inner diameter of 7.5 mm. These packed columns were mounted on to a liquid chromatography system (manufactured by TOSOH CORPORATION) comprising a feed pump (CCPM-II), autosampler (AS-8020), ultraviolet-visible light adsorption photometer (UV-8020) and system controller (SC-8020). Then, the operation was carried out under following chromatography conditions to measure the peak elution time of each sample.

Chromatography condition 1:

Eluent 1: 50 mmol/liter acetic acid buffer (containing 0.15 mol/liter of sodium chloride, pH 4.5), Eluent 2: 50 mmol/liter phosphate buffer (containing 0.15 mol/liter of sodium chloride, pH 7.2), Elution method: 60 minutes linear gradient elution from 100% of the eluent 1 to 100% of the eluent 2, and then 5 minutes elution by 100% of the eluent 2 followed by 15 minutes regeneration equilibration by 100% of the eluent 1, Flow rate of eluent: 1.0 ml/minute, Sample: soybean trypsin inhibitor (hereinafter referred to simply as STI), bovine serum albumin (hereinafter referred to simply as BSA), human γ-globulin (hereinafter referred to simply as IgG) and bovine α-chymotrypsinogen A (hereinafter referred to simply as CHY), Sample concentration: respectively 2.0 g/liter (as dissolved in the eluent 1), Amount of sample injection: 0.2 ml, Temperature: 25° C., Detection: ultraviolet ray adsorption, wavelength: 280 nm.

(2) Measurement of BSA Adsorption Amount and Recovery Rate:

30 ml of adsorption buffer and 1.0 ml of one of packing materials shown in Tables 1 and 2 were added into a 200 ml Erlenmeyer flask. 10 ml of a solution having BSA dissolved in adsorption buffer to a concentration of 7.5 g/liter was added to the Erlenmeyer flask and shaked for 3.0 hours at temperature of 25° C. to let BSA be adsorbed. Then, its supernatant was diluted two folds by the adsorption buffer, and the absorbance was measured. A blank which contained no packing material was also diluted in the same manner as described above, and the absorbance was measured. From the difference between the two, the BSA adsorption amount was obtained.

Absorbance difference: $\Delta I = Ib - W \times Is$

Ib: Absorbance of two folds diluted blank,

Is: Absorbance of two folds diluted supernatant,

W: Coefficient for drag-in water content in packing material (in all the packing materials, W=1.015).

BSA adsorption amount: $A = 80 \times F(\Delta I)$ $F(\Delta I)$: Function for relation between absorbance and BSA concentration.

Here, at the time of obtaining BSA adsorption amount, BSA solutions having concentrations of 0.75 g/liter and 1.5 g/liter were prepared, and their absorbances at a wavelength of 280 nm were preliminarily measured, to prepare a relational expression of the BSA concentration and the ultraviolet absorbance at a wavelength of 280 nm.

Then, the BSA-adsorbed packing material was washed by 30 ml of adsorption buffer and transferred to a filter-equipped column (inner diameter: 10 mm), and then unadsorbed BSA was washed off further by 10 ml of adsorption buffer. Then, elution buffer was poured into the column, and at least 45 ml of the eluent was collected and recovered in a 50 ml measuring flask, followed by dilution with elution buffer to measure the absorbance. The BSA recovery amount was calculated from the function for relation between absorbance and BSA concentration. The recovery rate was calculated from the calculated adsorption amount and recovery amount.

Adsorption buffer: 50 mmol/liter acetic acid buffer (containing 0.15 mol/liter of sodium chloride, pH 4.0), Elution buffer: 0.1 mol/liter tris-HCl buffer (containing 0.3 mol/liter of sodium chloride, pH 8.5)

The packing materials shown in Table 2 were packing materials prepared in such a manner that base matrices (TOYOPEARL HW-60C) having an exclusion limit molecular weight of 800,000 as calculated as pullulan and a porosity of 75% were activated by CDI and then the respective ligands were introduced. It was confirmed that they adsorbed and retained various proteins under a weakly acidic condition, and the adsorbed proteins were eluted as the pH increased.

For example, in a case where the pKa of each packing material was measured, the packing material 3 having 4-aminomethylbenzoic acid introduced had a pKa of about 5.1, which was higher than 4.2 being the pKa of three types of packing materials having other ligands introduced. Therefore, in the case of the packing material 3, the elution time was delayed, since the packing material was hydrophilized and proteins were eluted at a pH where the pH of the eluent was higher.

On the other hand, the packing material 4 having L-leucine as the ligand was relatively weak in the hydrophobicity, and therefore was hydrophilized by lower ionization, whereby the elution time became faster with respect to most proteins. However, with respect to BSA, a relatively strong interaction was observed.

Further, the BSA adsorption amount was, by all of these packing materials, within a range of 55 to 60 mg/ml and roughly determined by the effective surface area to BSA of the base matrix (TOYOPEARL HW-60C) used for the packing materials, although there are slight differences depending on ligands. Further, the recovery rates were high at a level of at least 94% in all cases.

Example 2

With respect to the packing materials 9 to 11 prepared in Production Examples 10 to 12, the main peak elution time and BSA adsorption amount of each protein sample were measured for each of the packing materials in the same manner as in Example 1. The obtained results are shown in Table 3.

The packing materials 9 to 11 were, like the packing materials 1 to 4, packing materials wherein TOYOPEARL HW-60C was used as a base matrix, and a hydrophobic amino acid was introduced by an amide bond using a packing material to which carboxyl methyl groups were introduced.

As apparent from Table 3, a group of the packing materials (packing materials 9 to 11) to which the respective ligands were introduced by amide bonds was also confirmed that they adsorbed and retained various proteins under a weakly acidic condition and then the adsorbed proteins were eluted as the pH increased.

Further, the packing material 11 having α-aminooctanoic acid introduced as the ligand was relatively weak in the hydrophobicity, and therefore eluted proteins by selectivity different from packing materials having other ligands introduced, for the same reason as for the packing material 4.

With respect to BSA absorption amount, it was within a range of 56 to 60 mg/ml by all the packing materials, and was roughly determined by the effective surface area to BSA of the base matrix (TOYOPEARL HW-60C) used for the packing materials although there were slight differences depending on ligands. Further, the recovery rates were high at a level of at least 93% in all cases.

Example 3

The packing materials 5 to 8 prepared in Production Examples 5 to 8 were a group of packing materials wherein a base matrix different in the pore property from the packing material 1 was used, and after CDI activation in the same manner as the packing material 1, L-phenylalanine and glycine were introduced. With respect to these packing materials, the peak elution time and BSA absorption amount of each protein sample were measured for each packing material in the same manner as in Example 1. The obtained results are shown in Table 2.

As apparent from Table 2, the packing material 5 has an exclusion limit molecular weight similar to the packing material 1 but is synthesized from a base matrix having a high porosity [Sepharose 6-Fast Flow (manufactured by GE Healthcare)]. The elution behavior, BSA adsorption amount and recovery rate of each protein also showed results similar to those of the packing material 1.

Further, the packing material 6 has a porosity similar to the packing material 1, but its exclusion limit molecular weight is large and is synthesized from a base matrix having a small effective surface area to protein [TOYOPEARL HW-65C (manufactured by TOSOH CORPORATION)]. Although the elution behavior of each protein showed similar results, its amount of BSA adsorption was 57% of that of the packing material 1. The recovery rate showed similar results. Thus, the desired function was confirmed.

Further, the packing material 7 has a porosity similar to the packing material 1, but it is synthesized from a base matrix having a little exclusion limit molecular weight [TOYOPEARL HW-50C (manufactured by TOSOH CORPORATION)], whereby pores into which proteins having a molecular weight of at least ten-thousands can penetrate are limited. Its amount of ligand binding was largest, but its retention time of a high molecular weight protein such as IgG was a bit shorter, and with respect to other proteins, the value was similar to that of the packing material 1.

Its BSA adsorption amount was 40% of that of the packing material 1, and its recovery rate showed similar results. Its function to adsorb proteins dissolved at a salt concentration degree of saline solution under a weakly acidic condition and elute them under a neutral condition was confirmed, although the adsorption amount was influenced by the molecular sizes of proteins.

Further, the packing material 8 has a small exclusion limit molecular weight, and is synthesized from a base matrix which has substantially no pores into which proteins can penetrate [Sephadex G-25 (manufactured by GE Healthcare)]. For this reason, it is considered that the ligand which can contact with proteins is limited to only the one introduced to the outer surface of particles, although the ligand may be introduced to the inside of pores. Therefore, the results were such that the adsorption amount was a very small although the recovery rate of proteins was at a same level.

The function of the packing material 8 to adsorb proteins dissolved at a salt concentration degree of saline solution under a weakly acidic condition and elute them under a neutral condition was confirmed.

Example 4

With respect to the packing material 12 obtained in Production Example 13, the main peak elution time and BSA adsorption amount of each protein sample were measured in the same manner as in Production Example 1. The obtained results are shown in Table 3.

The packing material 12 is one wherein a packing material having carboxymethyl groups introduced to TOYOPEARL HW-60C as a base matrix is used, and 4-aminomethylbenzoic acid is introduced by an amide bond, in the same manner as the packing materials 1 to 4.

As apparent from Table 3, it was confirmed that the packing material 12 to which this ligand was introduced by an amide bond, also adsorbed and retained various proteins under a weakly acidic condition and then eluted them as the pH increased.

The packing material 12 has a pKa of about 5.0, for the same reason as the packing material 3, and eluted proteins by selectivity different from the packing materials having other ligands introduced.

The BSA adsorption amount was 60 mg/ml which is similar to the adsorption amount of other packing materials wherein TOYOPEARL HW-60C was used as a base matrix. Further, the recovery rate was high at a level of 96%. Therefore, this packing material was confirmed to have the desired function.

Example 5

With respect to the packing materials 13 and 14 prepared in Production Examples 15 and 16, the main peak elution time and BSA adsorption amount of each protein sample were measured for each packing material in the same manner as in Example 1. The obtained results are shown in Table 3.

The packing materials 13 and 14 were ones wherein TOYOPEARL HW-65C having a large pore size was used as a base matrix, and carboxy groups were introduced thereto and then tryptophan was immobilized by an amide bond as a ligand together. A difference in the immobilized amount was observed by an increase or decrease of the amount of EDC used. A nitrogen percent obtained from the elemental analysis was 0.8% in the packing material 13 and 0.3% in the packing material 14. Such a difference in the immobilized amount appeared as a difference in the elution amount of proteins.

On the other hand, the BSA absorption amounts were 32 mg/ml and 30 mg/ml in the respective packing materials and thus showed similar results regardless of the difference in ligand immobilizing amount. This may be explained such that the adsorption amount is roughly determined by the effective surface area of a base matrix used for packing material to BSA. Further, the recovery rate was high at a level of at least 95%.

Example 6

The packing material 15 is a packing material which used a carboxymethyl group-introduced agarose packing material [product name: CM-Sepharose-Fast Flow] as a base matrix, wherein DL-phenylalanine was introduced as a ligand by an amide bond. The main peak elution time and BSA adsorption amount of each protein sample were measured in the same manner as in Example 1. The obtained results are shown in Table 3.

As apparent from Table 3, the BSA adsorption amount was 60 mg/ml which is similar to the adsorption amount of other packing materials wherein base matrix was TOYOPEARL-60C. Further, the recovery rate was high at a level of 95%.

Comparative Example 1

With respect to the CM ion exchange packing materials 1 and 2 synthesized in Production Examples 9 and 14, the main peak elution time and BSA adsorption amount of each protein sample were measured for each packing material in the same manner as in Example 1. The obtained results are shown in Table 3.

As apparent from Table 3, in these packing materials, BSA was retained and adsorbed by cation exchange effects in a case where the salt concentration is low. However, because the adsorption buffer contains 0.15 mol/liter of sodium chloride, BSA was not adsorbed but eluted. Therefore, the purpose of the present invention cannot be accomplished by hydrophilic CM ion exchange packing materials since they require dilution or desalting as pre-treatment.

Comparative Example 2

With respect to the packing material 16 synthesized in Production Example 18, the main peak elution time and BSA adsorption amount of each protein sample were measured in the same manner as in Example 1. The obtained results are shown in Table 3.

As apparent from Table 3, protein adsorption based on hydrophobicity did not occur and all of the introduced proteins were passed straight therethrough and eluted.

In the packing material 16, carboxy groups belonging to phenylalanine of the ligand coexist with amino groups bonded to epoxy groups. Therefore, amino groups will be ionized under an acidic condition while carboxy groups will be ionized under a basic condition, and both functional groups will be ionized under the intermediate range condition. In other words, because the packing material 16 will not express sufficient hydrophobicity, it failed in accomplishing the purpose of adsorbing and desorbing proteins by a pH change of the eluent.

Comparative Example 3

With respect to the packing material 17 synthesized in Production Example 19, the main peak elution time and BSA adsorption amount of each protein sample were measured in the same manner as in Example 1. The obtained results are shown in Table 3.

As apparent from Table 3, protein adsorption based on hydrophobicity did not occur and all of the introduced proteins were passed straight therethrough and eluted.

In the packing material 17, like packing material 16, carboxy groups belonging to phenylalanine of the coexist with secondary amino groups obtained by formyl group binding followed by reduction treatment. Therefore, for the same reason as the packing material 16, the packing material 17 did not express sufficient hydrophobicity and failed in accomplishing the purpose of adsorbing and desorbing proteins by a pH change of the eluent.

Production Example 20

The polymethacrylate porous packing material [TOYOPEARL HW-65C (manufactured by TOSOH CORPORATION)] having alcoholic hydroxy groups on its surface was repeatedly suspended and filtrated by pure water on a glass filter, and pure water of such a base matrix slurry was removed by suction filtration to prepare a suction dry-gel cake.

200 g of the gel cake, 300 ml of pure water and 100 g of chloromethyloxirane were introduced into a 1 liter separable flask, and with stirring, 85 g of 48% sodium hydroxide was dropwise added over a period of 2 hours while maintaining the reaction temperature at 45° C. After the dropwise addition, the reaction was carried out for further 1 hour, and then suspension and filtration were repeated for washing with pure water to prepare a suction dry-gel cake of the epoxy activated base matrix. The entire amount of the epoxy activated gel cake, 130 g of dextran having a weight average molecular weight of 500,000 and 350 ml of pure water were added to the 1 liter separable flask, and then stirred while maintaining the temperature at 25° C. to dissolve dextran. Further, 10 g of 48% sodium hydroxide was added, and the reaction was carried out for further 16 hours, and then suspension and filtration were repeated for washing with pure water to prepare a suction dry-gel cake of the dextran immobilized base matrix. This is referred to as intermediate base matrix 1. The dextran immobilized amount of the intermediate base matrix 1 was measured by the following method.

Measurement of Polysaccharide Immobilized Amount 1:

10 g of the intermediate base matrix 1 (suction dry-gel cake) was suspended in 15 ml of pure water and then poured into a glass column having an inner diameter of 20 mm and equipped with a glass filter, and then the solvent was removed by suction filtration. From the height of the formed bed (the portion of the packing material sedimented in the column), the volume of the base matrix was obtained. Separately, 5 g of the intermediate base matrix 1 (suction dry-gel cake) was taken and dried under reduced pressure at 50° C., whereupon the weight was measured. The dried gel and 20 ml of 2 mol/liter hydrochloric acid were added into a 100 ml Erlenmeyer flask equipped with a reflux condenser, and then dextran was hydrolyzed under 90° C. for 150 minutes. After the reaction, the base matrix was washed with pure water by repeated suspension and filtration on a glass filter and again dried under reduced pressure at 50° C., whereupon the weight was measured. The dextran immobilized amount was obtained from the difference in dried weight of the base matrix before and after the hydrolysis. The obtained results of measurement are shown in Table 4.

TABLE 4

| Intermediate base matrix | Base matrix | Polysaccharide (average molecular weight) | Polysaccharide immobilized amount mg/g dry gel | Measurement |
|---|---|---|---|---|
| Intermediate base matrix 1 | HW65C | Dextran (500,000) | 110 | Hydrolysis + weight measurement |
| Intermediate base matrix 2 | HW65C | Dextran (200,000) | 98 | Hydrolysis + weight measurement |
| Intermediate base matrix 3 | HW65C | Pullulan (200,000) | 100 | Hydrolysis + weight measurement |
| Intermediate base matrix 4 | HW55C | Dextran (70,000) | 65 | Hydrolysis + weight measurement |
| Intermediate base matrix 5 | HW50C | Dextran (10,000) | 15 | Hydrolysis + weight measurement |
| Intermediate base matrix 6 | Sepharose 6FF | Dextran (200,000) | 200 | Weight measurement |
| Intermediate base matrix 7 | Sephadex G25 | Dextran (200,000) | At most 3 | Weight measurement |
| Intermediate base matrix 8 | HW65C | HECel [1] (400,000) | 52 | Hydrolysis + weight measurement |

HECel: Hydroxyethyl cellulose

Then, 50 mg of intermediate base matrix 1 (suction dry-gel cake) was repeatedly suspended and filtrated with N,N-dimethylformamide (hereinafter referred to as DMF) solvent to remove water content, and the dispersion solvent of such a packing material slurry was removed by suction filtration to prepare a suction dry-gel cake.

50 g of the gel cake and 100 ml of DMF were added into a 300 ml separable flask and stirred. 60 mmol of the CDI was dissolved in 30 g of dioxane, and the CDI solution was dropwise added to the separable flask at a constant temperature of 30° C. After the dropwise addition, stirring was continued for 1 hour. Then, the slurry was filtrated by a glass filter, the gel was washed with DMF solvent to remove unreacted CDI or by-products, thereby to synthesize a CDI activated suction dry-gel cake.

The entire amount of the obtained gel cake was added again to a 300 ml separable flask and 100 ml of dimethylformamide (hereinafter referred to as DMF) was added, followed by stirring. 24 mmol of L-phenylalanine and 6 mmol of glycine were dissolved in 25 ml of an aqueous solution containing 1 mol/liter of sodium hydroxide, and 50 ml of DMF was added and mixed. This amino acid solution was put into the above separable flask all at once and stirred and reacted for 16 hours at room temperature.

After completion of the reaction, the obtained gel was washed again on a glass filter by DMF, 50% of acetone, 0.1 mol/liter of sodium hydroxide solution and pure water in this order. The gel obtained from this reaction is referred to as packing material 18.
Measurement of Ion Exchange Capacity:

10 g of the washed packing material 18 (suction dry-gel cake) was suspended in 15 ml of pure water, and poured into a glass column having an inner diameter of 20 mm and equipped with a glass filter, and the solvent was removed by suction filtration. From the formed bed (the portion of the packing material sedimented in the column), a portion exceeding 10 ml of the packing material was removed (i.e. the packing material in the column became 10 ml), followed by washing twice with 30 ml of 0.5 mol/liter hydrochloric acid. Thereafter, washing was repeated with 40 ml of pure water until the pH of the filtrate became 5 or higher. The washed packing material was taken out and transferred to a 200 ml beaker, and then suspended in 100 ml of a 0.5 mol/liter salt solution and titrated with a 0.5 mol/liter sodium hydroxide solution by using an automatic titration device (COM-450, manufactured by Hiranuma Sangyo Corporation). The end point was pH 8.5. The ion exchange capacity calculated from the titration liquid volume till the end point was 125 milliequivalent/liter. The total ligand amount of phenylalanine and glycine to the packing material 18 corresponds to the ion exchange capacity of the packing material 18 and is 115 mmol/liter.

Production Example 21

An epoxy activated base matrix suction dry-gel cake was synthesized in the same manner as in Production Example 20 by using TOYOPEARL HW-65C and under the came condition. The entire amount of the obtained epoxy activated gel cake, 150 g of dextran having a weight average molecular weight of 200,000 and 350 ml of pure water were added to the 1 liter separable flask and then dextran was dissolved by stirring while maintaining the temperature at 25° C. Then, 10 g of 48% sodium hydroxide was poured, and the reaction was carried out for further 16 hours, and then suspension and filtration were repeated for washing with pure water on a glass filter to prepare a suction dry-gel cake of the dextran immobilized base matrix. The obtained gel cake is referred to as intermediate base matrix 2. The dextran immobilized amount of the intermediate base matrix 2 was measured in the same manner as in Production Example 20. The obtained results of measurement are shown in Table 4.

Then, using the intermediate base matrix 2, a CDI activated suction dry-gel cake was synthesized in the same manner as in Production Example 20. Using the entire amount of the obtained CDI activated gel cake, in the same manner as Production Example 20, L-phenylalanine and glycine were stirred for 16 hours under a room temperature condition to carry out the reaction.

After completion of the reaction, the obtained gel was washed again on a glass filter by DMF, 50% acetone, 0.1 mol/liter sodium hydroxide solution and pure water in this order. The gel obtained from this reaction is referred to as packing material 19.

Its ion exchange capacity was measured in the same manner as in Production Example 20 and was found to be 110 milli-equivalent/liter. The total ligand amount of phenylalanine and glycine to the packing material 19 corresponds to the ion exchange capacity of the packing material 19 and is 110 mmol/liter.

Production Example 22

An epoxy activated base matrix suction dry-gel cake was synthesized in the same manner and under the same condition as in Production Example 20 by using TOYOPEARL HW-65C. The entire amount of the obtained epoxy activated gel cake, 150 g of pullulan having a weight average molecular weight of 200,000 and 350 ml of pure water were added to the 1 liter separable flask, and then pullulan was dissolved by stirring while maintaining the temperature at 25° C. Then, 10 g of 48% sodium hydroxide was poured, and the reaction was carried out for further 16 hours, and then suspension and filtration were repeated for washing with pure water on a glass filter to prepare a suction dry-gel cake of the pullulan immobilized base matrix. The obtained gel cake is referred to as intermediate base matrix 3. The dextran immobilized amount of the intermediate base matrix 3 was measured in the same manner as Production Example 20. The obtained results of measurement are shown in Table 4.

Then, using the intermediate base matrix 3, a CDI activated suction dry-gel cake was synthesized in the same manner as in Production Example 20. Using the entire amount of the obtained CDI activated gel cake, in the same manner as Production Example 20, L-phenylalanine and glycine were stirred for 16 hours under a room temperature condition to carry out the reaction.

After completion of the reaction, the obtained gel was washed again on a glass filter by DMF, 50% acetone, 0.1 mol/liter sodium hydroxide solution and pure water in this order. The gel obtained from this reaction is referred to as packing material 20.

Its ion exchange capacity was measured in the same manner as in Production Example 20 and was found to be 135 milli-equivalent/liter. The total ligand amount of phenylalanine and glycine to the packing material 20 corresponds to the ion exchange capacity of the packing material 20 and is 135 mmol/liter.

Production Example 23

The polymethacrylate porous packing material [TOYOPEARL HW-55C (manufactured by TOSOH CORPORATION)] having alcoholic hydroxy groups on its surface was washed with pure water by repeated suspension and filtration, and then pure water of such a base matrix slurry was removed by suction filtration to prepare a suction dry-gel cake.

Under the same condition as in Production Example 20, the suction dry-gel cake of epoxy activated base matrix was synthesized. The entire amount of the obtained epoxy activated gel cake, 150 g of dextran having a weight average molecular weight of 70,000 and 350 ml of pure water were added to the 1 liter separable flask, and then dextran was dissolved by stirring while maintaining the temperature at 25° C. Then, 10 g of 48% sodium hydroxide was poured, and the reaction was carried out for further 16 hours, and then suspension and filtration were repeated for washing with pure water on a glass filter to prepare a suction dry-gel cake of the dextran immobilized base matrix. The obtained gel cake is referred to as intermediate base matrix 4. The dextran immobilized amount of the intermediate base matrix 4 was measured in the same manner as Production Example 20. The obtained results of measurement are shown in Table 4.

Then, using the intermediate base matrix 4, a CDI activated suction dry-gel cake was synthesized in the same manner as in Production Example 20. Using the entire amount of the obtained CDI activated gel cake, in the same manner as in Production Example 20, L-phenylalanine and glycine were stirred for 16 hours under a room temperature condition to carry out the reaction.

After completion of the reaction, the obtained gel was washed again on a glass filter by DMF, 50% acetone, 0.1 mol/liter sodium hydroxide solution and pure water in this order. The gel obtained from this reaction is referred to as packing material 21.

Its ion exchange capacity was measured in the same manner as in Production Example 20 and was found to be 145 milli-equivalent/liter. The total ligand introduction amount of phenylalanine and glycine to the packing material 21 corresponds to the ion exchange capacity of the packing material 21 and is 145 mmol/liter.

Production Example 24

The polymethacrylate porous packing material [TOYOPEARL HW-50C (manufactured by TOSOH CORPORATION)] having alcoholic hydroxy groups on its surface was washed with pure water by repeated suspension and filtration, and then pure water of such a base matrix slurry was removed by suction filtration to prepare a suction dry-gel cake.

Under the same condition as in Production Example 20, the suction dry-gel cake of epoxy activated base matrix was synthesized. The entire amount of the obtained epoxy activated gel cake, 150 g of dextran having a weight average molecular weight of 10,000 and 350 ml of pure water were added to the 1 liter separable flask and then dextran was dissolved by stirring while maintaining temperature at 25° C. Then, 10 g of 48% sodium hydroxide was poured, and the reaction was carried out for further 16 hours, and then suspension and filtration were repeated for washing with pure water on a glass filter to prepare a suction dry-gel cake of the dextran immobilized base matrix. The obtained gel cake is referred to as intermediate base matrix 5. The dextran immobilized amount of the intermediate base matrix 5 was measured in the same manner as in Production Example 20. The obtained results of measurement are shown in Table 4.

Then, using the intermediate base matrix 5, a CDI activated suction dry-gel cake was sing the entire amount of the obtained CDI activated gel cake, in the same manner as in Production Example 20, L-phenylalanine and glycine were stirred for 16 hours under a room temperature condition to carry out the reaction.

After completion of the reaction, the obtained gel was washed again on a glass filter by DMF, 50% acetone, 0.1 mol/liter sodium hydroxide solution and pure water in this order. The gel obtained from this reaction is referred to as packing material 22.

Its ion exchange capacity was measured in the same manner as in Production Example 20 and was found to be 188 milli-equivalent/liter. The total ligand amount of phenylalanine and glycine to the packing material 22 corresponds to the ion exchange capacity of the packing material 22 and is 188 mmol/liter.

Production Example 25

The cross-linked agarose packing material [Sepharose 6-Fast Flow (manufactured by GE Healthcare)], was repeatedly suspended and filtrated by pure water on a glass filter, and pure water of such a base matrix slurry was removed by suction filtration to prepare a suction dry-gel cake.

In the same manner as in Example 20, 120 g of the gel cake, 180 ml of pure water and 60 g of chloromethyloxirane were added into a 0.5 liter separable flask, and with stirring, 51 g of 48% sodium hydroxide was dropwise added over a period of 2 hours while maintaining the reaction temperature at 45° C. After the dropwise addition, the reaction was continued for 1 hour, and suspension and filtration were repeated for washing with pure water on a glass filter to prepare 126.9 g of a suction dry-gel cake of the epoxy activated base matrix.

⅚th of the total amount i.e. 105.75 g of the epoxy activated gel cake, 75 g of dextran having a weight average molecular weight of 200,000 and 175 ml of pure water were added to the 0.5 liter separable flask, and dextran was dissolved with stirring, while maintaining the reaction temperature at 25° C. Then, 5 g of 48% sodium hydroxide was poured, and the reaction was carried out for further 16 hours, and then suspension and filtration were repeated for washing with pure water to prepare 114.7 g of a suction dry-gel cake of the dextran immobilized base matrix. The obtained gel cake is referred to as intermediate base matrix 6. The dextran immobilized amount of the intermediate base matrix 6 was measured by the following method for measurement of polysaccharide immobilized amount 2, since the base matrix may also be hydrolyzed by an acid.

Measurement of Polysaccharide Immobilized Amount 2:

At first, 10 g of the suction dry-gel cake of the epoxy activated base matrix was dried under reduced pressure at 50° C., and the weight was measured. Then, the weight was multiplied by the weight of the gel cake used for the dextran immobilizing reaction to obtain the dry weight. Then, 10 g of the intermediate base matrix 6 (suction dry-gel cake) was dried under reduced pressure at 50° C., and the weight was measured. Then, the obtained weight was multiplied by the gel cake weight of the intermediate base matrix 6 to obtain the dry weight. The difference in dry weight between the intermediate base matrix 6 and the epoxy activated base matrix used for the reaction becomes the weight of immobilized dextran, which was calculated as (weight of immobilized dextran) mg per (dry weight of intermediate base matrix 6) g. The obtained results of measurement are shown in Table 4.

Then, using the intermediate base matrix 6, a CDI activated suction dry-gel cake was synthesized in the same manner as in Production Example 20. Using the entire amount of the obtained CDI activated gel cake, in the same manner as in Production Example 1, L-phenylalanine and glycine were stirred for 16 hours under a room temperature condition to carry out the reaction.

After completion of the reaction, the obtained gel was washed again on a glass filter by DMF, 50% acetone, 0.1 mol/liter sodium hydroxide solution and pure water in this order. The gel obtained from this reaction is referred to as packing material 23.

Its ion exchange capacity was measured in the same manner as in Production Example 20 and was found to be 85 milli-equivalent/liter. The total ligand amount of phenylalanine and glycine to the packing material 23 corresponds to the ion exchange capacity of the packing material 23 and is 85 mmol/liter.

Production Example 26

The cross-linked agarose packing material [Sephadex G-25 (manufactured by GE Healthcare)], was repeatedly suspended and filtrated by pure water on a glass filter, and pure water of such a base matrix slurry was removed by suction filtration to prepare a suction dry-gel cake.

In the same manner as in Example 20, 120 g of the gel cake, 180 ml of pure water and 60 g of chloromethyloxirane were added into a 0.5 liter separable flask, and with stirring, 51 g of 48% sodium hydroxide was dropwise added over a period of 2 hours while maintaining the reaction temperature at 45° C. After the dropwise addition, the reaction was continued for 1 hour, and suspension and filtration were repeated for washing with pure water on a glass filter to prepare 123.6 g of a suction dry-gel cake of the epoxy activated base matrix.

⅚th of the total amount i.e. 103.0 g of the epoxy activated gel cake, 75 g of dextran having a weight average molecular weight of 200,000 and 175 ml of pure water were added to the 0.5 liter separable flask, and dextran was dissolved with stirring, while maintaining the reaction temperature at 25° C. Then, 5 g of 48% sodium hydroxide was poured, and the reaction was carried out for further 16 hours, and then suspension and filtration were repeated for washing with pure water to prepare 103.5 g of a suction dry-gel cake of the dextran immobilized base matrix. The obtained gel cake is referred to as intermediate base matrix 7. The dextran immobilized amount of intermediate base matrix 7 was measured by above-described method for measurement of polysaccharide immobilized amount 2, since the base matrix may also be hydrolyzed by an acid. The obtained results of measurement are shown in Table 4, and the weight increase was within a range of measurement error.

Then, using the intermediate base matrix 7, a CDI activated suction dry-gel cake was synthesized in the same manner as in Production Example 20. Using the entire amount of the obtained CDI activated gel cake, in the same manner as in Production Example 20, L-phenylalanine and glycine were stirred for 16 hours under a room temperature condition to carry out the reaction.

After completion of the reaction, the obtained gel was washed again on a glass filter by DMF, 50% acetone, 0.1 mol/liter sodium hydroxide solution and pure water in this order. The gel obtained from this reaction is referred to as packing material 24.

Its ion exchange capacity was measured in the same manner as in Production Example 20 and was found to be 163 milli-equivalent/liter. The total ligand amount of phenylalanine and glycine to the packing material 24 corresponds to the ion exchange capacity of the packing material 24 and is 163 mmol/liter.

The polysaccharide immobilized amounts of the intermediate base matrices prepared in Production Examples 20 to 26 are shown in Table 4.

Production Example 27

TOYOPEARL HW-65C was repeatedly suspended and filtrated by dioxane solvent on a glass filter to remove water content, and the dispersion solvent of such a packing material slurry was removed by suction filtration to prepare a suction dry-gel cake.

50 g of the gel cake and 100 ml of dioxane were added into a 300 ml separable flask and stirred. 60 mmol of the CDI was dissolved in 30 g of dioxane, and the CDI solution was dropwise added to the separable flask at a constant temperature of 30° C. After the dropwise addition, stirring was continued for 1 hour. Then, the slurry was filtrated by a glass filter, and the gel was washed with dioxane solvent to remove unreacted CDI or by-products, thereby to synthesize a CDI activated suction dry-gel cake.

The entire amount of the obtained gel cake was added again to a 300 ml separable flask, and 100 ml of DMF was added, followed by stirring. 24 mmol of L-phenylalanine and 6 mmol of glycine were dissolved in 25 ml of an aqueous solution containing 1 mol/liter of sodium hydroxide, and 50 ml of DMF was added and mixed. This amino acid solution was put into the above separable flask all at once and stirred and reacted for 16 hours at room temperature.

After completion the reaction, the obtained gel was washed again on a glass filter by DMF, 50% of acetone, 0.1 mol/liter of sodium hydroxide solution and pure water in this order. The gel obtained from this reaction is referred to as packing material 25. Its ion exchange capacity was measured in the same manner as in Production Example 20 and was found to be 80 milli-equivalent/liter. The total ligand amount of phenylalanine and glycine to the packing material 25 corresponds to the ion exchange capacity of the packing material 25 and is 80 mmol/liter.

Production Example 28

The cross-linked agarose packing material [Sepharose 6-Fast Flow (manufactured by GE Healthcare)], was repeatedly suspended and filtrated by dioxane solvent on a glass filter to remove water content, and the dispersion solvent of such a packing material slurry was removed by suction filtration to prepare a suction dry-gel cake.

50 g of the gel cake was reacted and treated in the same manner as in Production Example 26 to obtain packing material 26. Its ion exchange capacity was measured in the same manner as in Production Example 20 and was found to be 100 milli-equivalent/liter. The total ligand introduction amount of phenylalanine and glycine to the packing material 26 corresponds to the ion exchange capacity of the packing material 26 and is 100 mmol/liter.

Production Example 29

By using 50 g of the intermediate base matrix 1 (suction dry-gel cake) synthesized in Production Example 20, a CDI activated suction dry-gel cake was synthesized in the same manner as in Production Example 20.

The half amount of the obtained gel cake was added into a 100 ml separable flask and 50 ml of DMF was added, followed by stirring. 12 mmol of 4-aminomethylbenzoic acid and 3 mmol of glycine were dissolved in 12.5 ml of an aqueous solution containing 1 mol/liter of sodium hydroxide, and 25 ml of DMF was added and mixed. This amino acid solution was put into the above separable flask all at once and stirred and reacted for 16 hours at room temperature.

After completion of the reaction, the obtained gel was washed again on a glass filter by DMF, 50% acetone, 0.1 mol/liter sodium hydroxide solution and pure water in this order. The gel obtained from this reaction is referred to as packing material 27.

Its ion exchange capacity was measured in the same manner as in Production Example 20 and was found to be 115 milli-equivalent/liter. The total ligand amount of 4-aminomethylbenzoic acid and glycine to the packing material 27 corresponds to the ion exchange capacity of the packing material 27 and is 115 mmol/liter.

Production Example 30

The half amount of residual CDI activated suction dry-gel cake synthesized in Production Example 29 was added into a 100 ml separable flask and 50 ml of DMF was added, followed by stirring. 15 mmol of α-aminooctanoic acid was dissolved in an aqueous solution containing 1 mol/liter of sodium hydroxide, and 25 ml of DMF was added and mixed. This amino acid solution was put into the above separable flask all at once and stirred and reacted for 16 hours at room temperature.

After completion of the reaction, the obtained gel was washed again on a glass filter by DMF, 50% acetone, 0.1 mol/liter sodium hydroxide solution and pure water in this order. The gel obtained from this reaction is referred to as packing material 28.

Its ion exchange capacity was measured in the same manner as in Production Example 20 and was found to be 105 milli-equivalent/liter. The ligand amount of α-aminooctanoic to the packing material 28 corresponds to the ion exchange capacity of the packing material 28 and is 105 mmol/liter.

The base matrix, activating agent, ligand and ion exchange capacity of each of the packing materials prepared by Production Examples 20 to 30 are shown in Table 5.

TABLE 5

| Packing material | Production Example | Base matrix | Activating agent | Ligand[1] (molar ratio) | Ion exchange capacity meq/l | Protein elution amount (ml) BSA | IgG | CHY | BSA adsorption amount mg/ml | Recovery rate (%) | IgG adsorption amount mg/ml | Recovery rate (%) |
|---|---|---|---|---|---|---|---|---|---|---|---|---|
| 18 | 20 | Intermediate base matrix 1 | CDI | L-Phe:Gly (8/2) | 115 | 33.0 | 34.2 | 40.6 | 104 | 96 | 126 | 95 |
| 19 | 21 | Intermediate base matrix 2 | CDI | L-Phe:Gly (8/2) | 110 | 32.5 | 33.4 | 40.1 | 103 | 96 | 121 | 95 |
| 20 | 22 | Intermediate base matrix 3 | CDI | L-Phe:Gly (8/2) | 135 | 32.7 | 33.6 | 40.2 | 108 | 96 | 124 | 95 |
| 21 | 23 | Intermediate base matrix 4 | CDI | L-Phe:Gly (8/2) | 145 | 33.5 | 33.0 | 41.2 | 104 | 95 | 86 | 94 |
| 22 | 24 | Intermediate base matrix 5 | CDI | L-Phe:Gly (8/2) | 188 | 31.4 | 29.6 | 42.6 | 32 | 94 | 20 | 94 |

TABLE 5-continued

| Packing material | Production Example | Base matrix | Activating agent | Ligand[1] (molar ratio) | Ion exchange capacity meq/l | Protein elution amount (ml) | | | BSA adsorption amount | | IgG adsorption amount | |
|---|---|---|---|---|---|---|---|---|---|---|---|---|
| | | | | | | BSA | IgG | CHY | mg/ml | Recovery rate (%) | mg/ml | Recovery rate (%) |
| 23 | 25 | Intermediate base matrix 6 | CDI | L-Phe:Gly (8/2) | 110 | 30.9 | 32.4 | 38.3 | 106 | 96 | 94 | 95 |
| 24 | 26 | Intermediate base matrix 7 | CDI | L-Phe:Gly (8/2) | 163 | 26.2 | 23.4 | 27.8 | 10 | 94 | 10 | 92 |
| 25 | 27 | HW65C | CDI | L-Phe:Gly (8/2) | 80 | 33.8 | 33.0 | 40.6 | 34 | 95 | 38 | 94 |
| 26 | 28 | Sepharose 6FF | CDI | L-Phe:Gly (8/2) | 100 | 34.5 | 34.0 | 41.2 | 58 | 95 | 60 | 94 |
| 27 | 29 | Intermediate base matrix 2 | CDI | 4-AMBA | 115 | 48.5 | 48.5 | 48.8 | 98 | 93 | 115 | 92 |
| 28 | 30 | Intermediate base matrix 2 | CDI | ACA | 105 | 42.2 | 32.1 | 28.4 | 95 | 93 | 106 | 93 |

[1]L-Phe: L-phenylalanine, Gly: Glycine, 4-AMBA: 4-aminomethylbenzoic acid, ACA: α-aminooctanoic acid Production Example 31

120 g of the gel cake of intermediate base matrix 2 synthesized in Production Example 21, 0.8 mol of sodium chloroacetate and 240 ml of pure water were added into a 500 ml separable flask, and with stirring, a 48% sodium hydroxide aqueous solution was dropwise added in an amount corresponding to 1.1 mols of sodium hydroxide to the separable flask over a period of 1 hour at a reaction temperature of 50° C. After the dropwise addition, the reaction was continued for 3 hours, and the obtained gel was washed by pure water. The gel having carboxymethyl groups as ion exchange groups, obtained by this reaction, is referred to as CM intermediate base matrix 2 (hereinafter, CM is an abbreviation for carboxymethyl). Its ion exchange capacity was measured in the same manner as in Production Example 20 and was found to be 160 milli-equivalent/liter.

60 g of the obtained CM intermediate base matrix 2 gel cake was washed on a glass filter by 0.5 mol/liter hydrochloric acid and then pure water until the filtrate became neutral. Further, suspension and filtration by dioxane solvent were repeated to remove water content, and the dispersion solvent of such a packing material slurry was removed by suction filtration to prepare a suction dry-gel cake.

60 g of the gel cake and 150 ml of DMF were added into a 300 ml separable flask, and then 35 mmol of N-hydroxysuccinimide (hereinafter referred to simply as NHS) and 30 mmol of diisopropylcarbodiimide (hereinafter referred to simply as DIC) were added, followed by stirring. The stirring was continued for 2 hours at 30° C., and then the slurry was filtrated by a glass filter. The obtained gel was washed with dioxane solvent to remove unreacted materials or by-products, thereby to obtain 63.5 g of a dioxane-suction dry-gel cake. The gel cake obtained from this reaction is referred to as NHS activated packing material 1.

20 g of the NHS activated packing material 1 was taken and added to a 100 ml separable flask, and then 10 ml of dioxane, 40 ml of a 0.1 mol/liter phosphate buffer (pH 6.9) and 6 mmol of L-tryptophan were added, followed by stirring. After the reaction for 16 hours at 25° C., the reaction solution was filtrated and removed, and then the obtained gel was washed by 50% acetone, 0.1 mol/liter hydrochloric acid, pure water and 0.1 mol/liter sodium hydroxide in this order to remove unreacted materials or by-products. The packing material obtained from this reaction is referred to as packing material 29. The ion exchange capacity of the packing material 29 was measured in the same manner as in Production Example 20 and was found to be 152 milli-equivalent/liter. Further, the swelling degree of the packing material 29 was measured and was found to be 4.0 ml/g.

Measurement of Swelling Degree:

The packing material 29 was washed twice by 30 ml of 0.5 mol/liter sodium hydroxide, and then washing was repeated with 40 ml of pure water until the pH of the filtrate became 8.5 or lower. 10 g of the washed packing material (suction dry-gel cake) was suspended in 15 ml of pure water, and poured into a glass column having an inner diameter of 20 mm and equipped with a glass filter, and the solvent was removed by suction filtration. From the formed bed, a portion exceeding 10 ml of the packing material was removed, and then 10 ml of the remaining packing material was transferred to a glass filter, followed by washing twice with 30 ml of 0.5 mol/liter hydrochloric acid. Thereafter, washing of the packing material was repeated with 40 ml of pure water until the pH of the filtrate became 5 or higher. After washing twice with 40 ml of acetone, the washed packing material was taken out and dried under reduced pressure at 40° C., and the weight of 10 ml of the packing material was measured to calculate the swelling degree [swelling degree (ml/g)=volume (ml)/weight (g)]. The swelling degree of this packing material was 5.2 ml/g.

Further, using the dried packing material as a sample for elemental analysis, the nitrogen weight percent was measured by means of CHN automatic analyzer (2400II, manufactured by Perkin Elmer). In Production 32 and subsequent Production Examples, an elemental analysis of dried packing material was conducted in the same manner.

Production Example 32

By using 120 g of the gel cake of the intermediate base matrix 3 synthesized in Production Example 22, in the same manner as in Production Example 31, the CM intermediate base matrix 3 gel having carboxymethyl groups as ion exchange groups was synthesized. Its ion exchange capacity was measured in the same manner as in Production Example 20 and was found to be 180 milli-equivalent/liter.

60 g of the gel cake of the obtained CM intermediate base matrix 3 was washed on a glass filter by 0.5 mol/liter hydrochloric acid and then by pure water until the filtrate became neutral. Further, suspension and filtration by DMF solvent were repeated to remove water content, and the dispersion solvent of such a packing material slurry was removed by suction filtration to prepare a suction dry-gel cake.

60 g of the gel cake was reacted with NHS in the same manner as in Production Example 29 to synthesize NHS activated packing material.

The slurry obtained after the reaction was filtrated on a glass filter, and then the gel was washed by dioxane solvent to remove unreacted materials or by-products, thereby to obtain 63.3 g of a dioxane-suction dry-gel cake.

20 g of the gel cake NHS activated packing material obtained from this reaction was taken and subjected to an addition reaction of L-tryptophan again in the same manner as in Production Example 31. The obtained gel was washed in the same manner to remove unreacted material or by-products. The packing material obtained from this reaction is referred to as packing material 30. The ion exchange capacity of packing material 30 was measured in the same manner as in Production Example 1 and was found to be 172 milli-equivalent/liter. Further, the swelling degree of the packing material 30 was measured and was found to be 4.0 ml/g.

Production Example 33

By using 120 g of the gel cake of the intermediate base matrix 4 synthesized in Production Example 23, in the same manner as Production Example 31, the gel of CM intermediate base matrix 4 having carboxymethyl groups as ion exchange groups was synthesized. Its ion exchange capacity was measured in the same manner as in Production Example 20 and was found to be 185 milli-equivalent/liter.

60 g of the gel cake of the obtained CM intermediate base matrix 4 was washed on a glass filter by 0.5 mol/liter hydrochloric acid and then by pure water until the filtrate became neutral. Further, suspension and filtration by DMF solvent were repeated to remove water content, and the dispersion solvent of such a packing material slurry was removed by suction filtration to prepare a suction dry-gel cake. The NHS activated packing material gel cake obtained from this reaction is referred to as NHS activated packing material 2.

20 g of the gel cake of the NHS activated packing material 2 was taken and subjected to an addition reaction of L-tryptophan again in the same manner as in Production Example 31. The obtained gel was washed in the same manner to remove unreacted material or by-products. The packing material obtained from this reaction is referred to as packing material 31. The ion exchange capacity of packing material 31 was measured in the same manner as in Production Example 20 and was found to be 178 milli-equivalent/liter. Further, the swelling degree of the packing material 31 was measured and was found to be 4.2 ml/g.

Production Example 34

By using 120 g of the gel cake of the intermediate base matrix 6 synthesized in Production Example 25, in the same manner as Production Example 31, the gel of CM intermediate base matrix 6 having carboxymethyl groups as ion exchange groups was synthesized. Its ion exchange capacity was measured in the same manner as in Production Example 20 and was found to be 115 milli-equivalent/liter.

60 g of the gel cake of the obtained CM intermediate base matrix 6 was washed on a glass filter by 0.1 mol/liter hydrochloric acid and then by pure water until the filtrate became neutral. Further, suspension and filtration by DMF solvent were repeated to remove water content, and the dispersion solvent of such a packing material slurry was removed by suction filtration to prepare a suction dry-gel cake. The NHS activated packing material gel cake obtained from this reaction is referred to as NHS activated packing material 3.

20 g of the gel cake NHS activated packing material 3 was taken and subjected to an addition reaction of L-tryptophan again in the same manner as in Production Example 31. The obtained gel was washed in the same manner to remove unreacted material or by-products. The packing material obtained from this reaction is referred to as packing material 32. The ion exchange capacity of packing material 32 was measured in the same manner as in Production Example 20 and was found to be 103 milli-equivalent/liter. Further, the swelling degree of packing material 32 was measured and was found to be 4.5 ml/g.

Production Example 35

30 g (corresponding to 35 ml) of the CM intermediate base matrix 2 synthesized in Production Example 31 and 35 ml of pure water were added into a 300 ml separable flask, and 0.5 mol/liter hydrochloric acid was gradually added to adjust the pH to 5.2. Then, 30 ml of dioxane, 10.9 mmol of NHS and 6 mmol of 4-aminomethylbenzoic acid were added to the separable flask, followed by stirring for dissolution. 10.9 mmol of 1-ethyl-3-(3-dimethylaminopropyl)carbodiimide hydrochloride (hereinafter sometimes referred to simply as EDC) was dissolved in 3.5 ml of pure water and then added to the separable flask at 25° C., and the reaction was carried out for 16 hours at 25° C. The reaction solution as removed by filtration, and then the obtained gel was washed with 50% acetone, 0.1 mol/liter hydrochloric acid and pure water in this order to remove unreacted materials or by-products. The gel obtained from this reaction is referred to as packing material 33. The ion exchange capacity of packing material 33 was measured in the same manner as in Production Example 20 and was found to be 151 milli-equivalent/liter. Further, the swelling degree of the packing material 33 was measured in the same manner as in Production Example 31 and was found to be 4.0 ml/g.

Production Example 36

30 g (corresponding to 35 ml) of the CM intermediate base matrix 2 synthesized in Production Example 31 and 35 ml of pure water were added into a 100 ml separable flask, and 0.5 mol/liter hydrochloric acid was gradually added to adjust the pH to 5.2. Then, 30 ml of dioxane, 10.9 mmol of NHS and 6 mmol of DL-phenylalanine were added to the separable flask, followed by stirring for dissolution. 10.9 mmol of 1-ethyl-3-(3-dimethylaminopropyl)carbodiimide hydrochloride was dissolved in 3.5 ml of pure water and then added to the separable flask at 25° C., and the reaction was carried out for 16 hours at 25° C. The reaction solution as removed by filtration, and then the obtained gel was washed with 50% acetone, 0.1 mol/liter hydrochloric acid and pure water in this order to remove unreacted materials or by-products. The gel obtained from this reaction is referred to as packing material 34. The ion exchange capacity of the packing material 34 was measured in the same manner as in Production Example 20 and was found to be 153 milli-equivalent/liter. Further, the swelling degree of the packing material 34 was measured in the same manner as in Production Example 31 and was found to be 4.0 ml/g.

Production Example 37

30 g (corresponding to 35 ml) of the CM intermediate base matrix 4 synthesized in Production Example 33 and 35 ml of pure water were added into a 100 ml separable flask, and 0.5 mol/liter hydrochloric acid was gradually added to adjust the pH to 5.2. Then, 30 ml of dioxane, 10.9 mmol of NHS, 6 mmol of DL-phenylalanine and 2-ethanolamine were added to the separable flask, followed by stirring for dissolution. 10.9 mmol of 1-ethyl-3-(3-dimethylaminopropyl)carbodiimide hydrochloride was dissolved in 3.5 ml of pure water and then added to the separable flask at 25° C., and the reaction was carried out for 16 hours at 25° C. The reaction solution was removed by filtration, and then the obtained gel was washed with 50% acetone, 0.1 mol/liter hydrochloric acid and pure water in this order to remove unreacted materials or by-products. The gel obtained from this reaction is referred to as packing material 35. The ion exchange capacity of packing material 35 was measured in the same manner as in Production Example 20 and was found to be 130 milli-equivalent/liter. Further, the swelling degree of the packing material 35 was measured in the same manner as in Production Example 31 and was found to be 4.2 ml/g.

Production Example 38

30 g (corresponding to 35 ml) of the CM intermediate base matrix 3 synthesized in Production Example 32 and 35 ml of pure water were added into a 100 ml separable flask, and 0.5 mol/liter hydrochloric acid was gradually added to adjust the pH to 5.2. Then, 30 ml of dioxane, 10.9 mmol of NHS and 6 mmol of DL-tryptophan were added to the separable flask, followed by stirring for dissolution. 10.9 mmol of 1-ethyl-3-(3-dimethylaminopropyl)carbodiimide hydrochloride was dissolved in 3.5 ml of pure water and then added to the separable flask at 25° C., and the reaction was carried out for 16 hours at 25° C. The reaction solution as removed by filtration, and then the obtained gel was washed with 50% acetone, 0.1 mol/liter hydrochloric acid and pure water in this order to remove unreacted materials or by-products. The gel obtained from this reaction is referred to as packing material 36. The ion exchange capacity of packing material 36 was measured in the same manner as in Production Example 20 and was found to be 170 milli-equivalent/liter. Further, the swelling degree of the packing material 36 was measured in the same manner as in Production Example 12 and was found to be 4.0 ml/g.

Production Example 39

30 g (corresponding to 35 ml) of the CM intermediate base matrix 6 synthesized in Production Example 34 and 35 ml of pure water were added into a 100 ml separable flask, and 0.5 mol/liter hydrochloric acid was gradually added to adjust the pH to 5.2. Then, 30 ml of dioxane, 10.9 mmol of NHS and 6 mmol of DL-tryptophan were added to the separable flask, followed by stirring for dissolution. 10.9 mmol of 1-ethyl-3-(3-dimethylaminopropyl)carbodiimide hydrochloride was dissolved in 3.5 ml of pure water and then added to the separable flask at 25° C., and the reaction was carried out for 16 hours at 25° C. The reaction solution as removed by filtration, and then the obtained gel was washed with 50% acetone, 0.1 mol/liter hydrochloric acid and pure water in this order to remove unreacted materials or by-products. The gel obtained from this reaction is referred to as packing material 37. The ion exchange capacity of the packing material 37 was measured in the same manner as in Production Example 20 and was found to be 105 milli-equivalent/liter. Further, the swelling degree of the packing material 37 was measured in the same manner as in Production Example 12 and was found to be 4.2 ml/q.

Production Example 40

CM-TOYOPEARL 650M (manufactured by TOSOH CORPORATION) was a CM ion exchange packing material having HW-65C as a base matrix and its ion exchange capacity was 110 milli-equivalent/liter. The packing material was repeatedly suspended and filtrated by pure water on a glass filter for pure water displacement, and then suction filtrated to prepare a suction dry-gel cake.

30 g (corresponding to 35 ml) of the gel cake and 35 ml of pure water were added into a 100 ml separable flask, and 0.5 mol/liter hydrochloric acid was gradually added to adjust the pH to 5.2. Then, 30 ml of dioxane, 10.9 mmol of NHS and 6 mmol of DL-tryptophan were added to the separable flask, followed by stirring for dissolution. 10.9 mmol of 1-ethyl-3-(3-dimethylaminopropyl)carbodiimide hydrochloride was dissolved in 3.5 ml of pure water and then added to the separable flask at 25° C., and the reaction was carried out for 16 hours at 25° C. The reaction solution was removed by filtration, and then the obtained gel was washed with 50% acetone, 0.1 mol/liter hydrochloric acid and pure water in this order to remove unreacted materials or by-products. The gel obtained from this reaction is referred to as packing material 38. The ion exchange capacity of the packing material 38 was measured in the same manner as in Production Example 20 and was found to be 102 milli-equivalent/liter. Further, the swelling degree of the packing material 38 was measured in the same manner as in Production Example 31 and was found to be 4.0 ml/g.

Production Example 41

The ion exchange capacity of the cross-linked agarose weak cation exchange gel [CM-Sepharose-Fast Flow (manufactured by GE-Healthcare)] was measured and was found to be 105 milli-equivalent/liter.

The cross-linked agarose weak cation exchange gel was repeatedly suspended and filtrated by pure water on a glass filter for pure water displacement and then suction filtrated to prepare a suction dry-gel cake.

17 g (corresponding to 20 ml) of the gel cake and 36 ml of pure water were added into a 100 ml separable flask, and 0.5 mol/liter hydrochloric acid was gradually added to adjust the pH to 5.0. Then, 20 ml of dioxane, 4.2 mmol of NHS and 2.1 mmol of DL-phenylalanine were added into the separable flask, and then stirred for dissolution. 4.2 mmol of EDC was dissolved in 2 ml of pure water and added to the separable flask at 25° C., and stirring was continued for 16 hours to carry out the reaction. The reaction solution was removed by filtration on a glass filter, and the obtained gel was washed by 50% acetone, 0.1 mol/liter sodium hydroxide and pure water in this order, to remove unreacted materials or by-products. The gel obtained from this reaction is referred to as packing material 39. Its ion exchange capacity was measured in the same manner as in Production Example 20 and was found to be 98 milli-equivalent/liter. Further, its swelling degree was measured in the same manner as in Production Example 31 and was found to be 10.6 ml/g.

Production Example 42

In the same manner as in Production Example 20, by using TOYOPEARL HW-65C, a suction dry-gel cake of an epoxy activated base matrix was synthesized under the same condition. The entire amount of the epoxy activated gel cake and a solution wherein 100 g of hydroxyethyl cellulose having a weight average molecular weight of 400,000 was dissolved in 350 ml of pure water were added and mixed. Then, while stirring and maintaining the reaction temperature at 25° C., 10 g of 48% sodium hydroxide was added, and the reaction was carried out for further 16 hours, and then suspension and filtration were repeated for washing with pure water on a glass filter to prepare a suction dry-gel cake of a hydroxyethyl cellulose immobilized base matrix. The prepared gel cake is referred to as intermediate base matrix 8. The hydroxyethyl cellulose immobilized amount of the intermediate base matrix 8 was measured in the same manner as in Production Example 20. The obtained results of measurement are shown in Table 4.

By using 120 of the gel cake of the synthesized intermediate base matrix 8, in the same manner as in Production Example 31, the CM intermediate base matrix 8 gel having carboxymethyl groups as ion exchange groups was synthesized. Its ion exchange capacity was measured in the same manner as in Production Example 1 and was found to be 86 milli-equivalent/liter.

30 g (corresponding to 35 ml) of the CM intermediate base matrix 8 and 35 ml of pure water were added into a 100 ml separable flask, and 0.5 mol/liter hydrochloric acid was gradually added to adjust the pH to 5.2. Then, 30 ml of dioxane, 10.9 mmol of NHS and 6 mmol of DL-tryptophan were added to the separable flask, followed by stirring for dissolution. 10.9 mmol of 1-ethyl-3-(3-dimethylaminopropyl)carbodiimide hydrochloride was dissolved in 3.5 ml of pure water and then added to the separable flask at 25° C., and the reaction was carried out for 16 hours at 25° C. The reaction solution was removed by filtration, and then the obtained gel was washed with 50% acetone, 0.1 mol/liter hydrochloric acid and pure water in this order to remove unreacted materials or by-products. The gel obtained from this reaction is referred to as packing material 40. The ion exchange capacity of the packing material 40 was measured in the same manner as in Production Example 20 and was found to be 86 milli-equivalent/liter. Further, the swelling degree of the packing material 40 was measured in the same manner as in Production Example 31 and was found to be 4.2 ml/g.

The base matrix, activating agent, ligand, ion exchange capacity and results of elemental analysis of each of the packing materials prepared by Production Examples 31 to 42 are shown in Table 6.

TABLE 6

| Packing material | Production Example | Base matrix | Activating agent | Ligand [1] (molar ratio) | Ion exchange capacity meq/l | Elemental analysis Nitrogen (%) | Protein elution amount (ml) BSA | IgG | CHY | BSA adsorption amount mg/ml | Recovery rate (%) | IgG adsorption amount mg/ml | Recovery rate (%) |
|---|---|---|---|---|---|---|---|---|---|---|---|---|---|
| 29 | 31 | CM intermediate base matrix 2 | DIC | L-Trp | 152 | 0.8 | 31.4 | 33.6 | 35.2 | 100 | 96 | 120 | 94 |
| 30 | 32 | CM intermediate base matrix 3 | DIC | L-Trp | 172 | 0.9 | 32.8 | 33.9 | 38.4 | 103 | 96 | 124 | 94 |
| 31 | 33 | CM intermediate base matrix 4 | DIC | L-Trp | 178 | 1.0 | 35.4 | 38.2 | 41.6 | 104 | 96 | 86 | 94 |
| 32 | 34 | CM intermediate base matrix 6 | DIC | L-Trp | 103 | 1.2 | 30.5 | 32.0 | 34.2 | 104 | 95 | 96 | 94 |
| 33 | 35 | CM intermediate base matrix 2 | EDC | 4-AMBA | 151 | 0.5 | 46.6 | 46.8 | 47.2 | 100 | 95 | 118 | 92 |
| 34 | 36 | CM intermediate base matrix 2 | EDC | DL-Phe | 148 | 0.5 | 30.4 | 31.3 | 33.8 | 102 | 96 | 122 | 95 |
| 35 | 37 | CM intermediate base matrix 4 | EDC | DL-Phe:EA (8/2) | 130 | 0.5 | 28.8 | 29.6 | 30.2 | 96 | 96 | 120 | 95 |
| 36 | 38 | CM intermediate base matrix 3 | EDC | L-Trp | 145 | 0.8 | 34.5 | 35.5 | 38.6 | 106 | 95 | 124 | 94 |
| 37 | 39 | CM intermediate base matrix 6 | EDC | L-Trp | 105 | 1.3 | 31.8 | 32.5 | 34.2 | 104 | 94 | 96 | 94 |
| 38 | 40 | CM-650M | EDC | L-Trp | 102 | 0.7 | 35.5 | 35.9 | 41.5 | 32 | 95 | 34 | 93 |
| 39 | 41 | CM-Sepharose FF | EDC | L-Trp | 98 | 1.2 | 34.3 | 35.5 | 40.8 | 57 | 95 | 59 | 94 |
| 40 | 42 | CM intermediate base matrix 8 | EDC | L-Trp | 86 | 0.5 | 29.8 | 30.9 | 35.4 | 92 | 95 | 110 | 94 |

[1] CM: Carboxymethyl, L-Trp: L-tryptophan, DL-Phe: DL-phenylalanine, EA: 2-ethanolamine, 4-AMBA: 4-aminophenylbenzoic acid Example 7

With respect to the packing materials 18 to 24 prepared in Production Examples 20 to 26, the main peak elution time of each protein sample, adsorption amount of bovine serum albumin (referred to simply as BSA) and adsorption amount of human γ-globulin (hereinafter referred to simply as IgG) were measured for each of the packing materials. The obtained results are shown in Table 5.

Further, the protein adsorption and elution by a pH gradient elution method, and measurements of the BSA and IgG adsorption amounts and recovery rates were conducted as follows.

(1) Protein Adsorption and Elution by pH Gradient Elution Method:

The packing materials shown in Table 5 were packed respectively to 75 mm stainless steel columns each having an inner diameter of 7.5 mm. These packed columns were mounted on a liquid chromatography system (manufactured by TOSOH CORPORATION) comprising a feed pump (CCPM-II), autosampler (AS-8020), ultraviolet-visible light adsorption photometer (UV-8020) and system controller (SC-8020). Then, the operation was carried out under following chromatography conditions to measure the peak elution time of each sample.

Chromatography Condition 1:

Eluent 1: 50 mmol/liter acetic acid buffer (containing 0.15 mol/liter of sodium chloride, pH 4.5), Eluent 2: 50 mmol/liter phosphate buffer (containing 0.15 mol/liter of sodium chloride, pH 7.2), Elution method: 60 minutes linear gradient elution from 100% of the eluent 1 to 100% of the eluent 2, and then 5 minutes elution by 100% of the eluent 2 followed by 15 minutes regeneration equilibration by 100% of the eluent 1, Flow rate of eluent: 1.0 ml/minute, Sample: soybean trypsin inhibitor (hereinafter referred to simply as STI), bovine serum albumin (hereinafter referred to simply as BSA), human γ-globulin (hereinafter referred to simply as IgG) and bovine α-chymotrypsinogen A (hereinafter referred to simply as CHY), Sample concentration: respectively 2.0 g/liter (as dissolved in the eluent 1), Amount of sample injection: 0.2 ml, Temperature: 25° C., Detection: ultraviolet ray adsorption, wavelength: 280 nm.

(2) Measurement of BSA Adsorption Amount and Recovery Rate:

30 ml of the adsorption buffer and 1.0 ml of one of packing materials shown in Table 5 were added into a 200 ml Erlenmeyer flask. 10 ml of a solution having BSA dissolved in the adsorption buffer to a concentration of 15 g/liter was added to the Erlenmeyer flask and shaked for 3.0 hours at temperature of 25° C. to let BSA be adsorbed. Then, its supernatant was diluted 2.5 folds by the adsorption buffer, and the absorbance was measured. A blank which contained no packing material was also diluted in the same manner as described above, and the absorbance was measured. From the difference between the two, the BSA adsorption amount was obtained.

Absorbance difference: $\Delta I = Ib - W \times Is$

Ib: Absorbance of 2.5 folds diluted blank,

Is: Absorbance of 2.5 folds diluted supernatant,

W: Coefficient for drag-in water content in packing material (in all the packing materials, W=1.015).

BSA adsorption amount: $A = 80 \times F(\Delta I)$ $F(\Delta I)$: Function for relation between absorbance and BSA concentration.

Here, at the time of obtaining the BSA adsorption amount, BSA solutions having concentrations of 0.75 g/liter and 1.5 g/liter were prepared, and their absorbances at a wavelength of 280 nm were preliminarily measured, to prepare a relational expression of the BSA concentration and the ultraviolet absorbance at a wavelength of 280 nm.

Then, the BSA-adsorbed packing material was washed by 30 ml of an adsorption buffer and transferred to a filter-equipped column (inner diameter: 10 mm), and then unadsorbed BSA was washed off further by 10 ml of the adsorption buffer. Then, an elution buffer was poured into the column, and at least 45 ml of the eluent was collected and recovered in a 50 ml measuring flask, followed by dilution with the elution buffer to measure the absorbance. The BSA recovery amount was calculated from the function for relation between absorbance and BSA concentration. The recovery rate was calculated from the calculated adsorption amount and recovery amount.

Adsorption buffer: 50 mmol/liter acetic acid buffer (containing 0.15 mol/liter of sodium chloride, pH 4.0), Elution buffer: 0.1 mol/liter tris-HCl buffer (containing 0.3 mol/liter of sodium chloride, pH 8.5)

(3) IgG Adsorption Amount and Recovery Rate:

30 ml of the adsorption buffer and 1.0 ml of one of packing materials shown in Table 5 were added into a 200 ml Erlenmeyer flask. 5 ml of human serum γ-globulin (manufactured by The Chemo-Sero-Therapeutic Research Institute) having a concentration of about 150 mg/ml was dissolved in the adsorption buffer and then diluted to 50 ml. 10 ml of the solution was added to the Erlenmeyer flask and shaked for 3.0 hours at temperature of 25° C. to let IgG be adsorbed. Then, its supernatant was diluted five folds by the adsorption buffer, and the absorbance was measured. A blank which contained no packing materials was also diluted in the same manner as described above, and the absorbance was measured. From the difference between the two, the BSA adsorption amount was obtained.

Absorbance difference: $\Delta I = Ib - W \times Is$

Ib: Absorbance of 5 folds diluted blank,

Is: Absorbance of 5 folds diluted supernatant,

W: Coefficient for drag-in water content in packing material (in all the packing materials, W=1.015).

IgG absorption amount: $A = 200 \times \Delta I / 1.4$ (Absorbance epr 1.0 g of IgG is 1.4.)

Then, the IgG-adsorbed packing material was washed by 30 ml of an adsorption buffer and transferred to a filter-equipped column (inner diameter: 10 mm), and then an adsorbed BSA was washed off further by 10 ml of the adsorption buffer. Then, an elution buffer was poured into the column, and at least 50 ml of the eluent was collected and recovered, followed by dilution in a 200 ml volumetric flask with the elution buffer to measure the absorbance. The IgG recovery amount was calculated from the absorbance. The recovery rate was calculated from the calculated adsorption amount and recovery amount.

IgG recovery amount: $R = 200 \times Ir / 1.4$

Ir: Absorbance of recovered IgG solution

Further, the adsorption buffer and elution buffer were the same solutions used for measurement of BSA adsorption amount.

The packing materials 18 to 24 shown in Table 5 were packing materials wherein base matrices having an exclusion limit molecular weight of 10,000 to 2,100,000 as calculated as pullulan or 3,000 as calculated as polyethylene glycol were CDI activated by intermediate base matrices to which non-ionic polysaccharides were immobilized, and then L-phenylalanine and glycine were introduced. As apparent from Table 5, it was confirmed that they adsorbed and retained various proteins under a weakly acidic condition, and the absorbed proteins were eluted as the pH increased.

Further, it was confirmed that BSA and IgG adsorption amounts of the packing materials 18 to 21 and 23 derived from base matrices having the exclusion limit molecular weight of at least 300,000 as calculated as pullulan were very high at a level of at least 85 mg/ml in all cases.

In a case where the packing materials 18 to 20 derived from base matrices having large exclusion limit molecular weight, the increasing effect of adsorption amount of IgG having a large molecular weight (molecular weight: 155,000) was high. In the case of the packing materials 21 to 23 derived from base matrices having a smaller exclusion limit molecular weight, the increasing effect of adsorption amount of BSA (molecular weight: 66,000) was high while the increasing effect of adsorption amount of IgG was relatively low.

On the other hand, the increasing effects of BSA and IgG adsorption amounts of the packing materials 22 and 24 having an exclusion limit molecular weight of at most 10,000 were not high in both packing materials. However, it was estimated that the adsorption amount of proteins having a molecular weight of smaller than BSA (proteins having a molecular weight of at most 50,000) or peptide might increase in the case of the packing materials 22. Further, in the case of the packing material 24, the increase in the absolute value of adsorption amount was not high because only outer surface of particles was used for proteins.

Further, the recovery rates were high at a level of at least 94% in all cases.

Reference Example 1

The packing materials 25 and 26 prepared in Production Examples 27 and 28 were packing materials wherein base matrices having an exclusion limit molecular weight of 400,000 or 2,100,000 were used for CDI activation, and then L-phenylalanine and glycine were introduced. In the same manner as in Example 7, the main peak elution time and BSA and IgG adsorption amount of each protein sample were measured for each of the packing materials. The obtained results are shown in Table 5.

As apparent from Table 5, it was confirmed that these packing materials adsorbed and retained various proteins under a weakly acidic condition, and the adsorbed proteins were eluted as the pH increased. However, even in a case where the packing material 26 having a pore property suitable for protein adsorption amount, BSA and IgG adsorption amount did not reach to 65 mg/ml. In the case of the packing material 25 having a large exclusion limit molecular weight and smaller effective surface area, the adsorption amount was more smaller. On the other hand, the adsorption amount of the packing materials 18 to 21 and 23 synthesized by using intermediate base matrices to which polysaccharides were immobilized were about three folds greater than the packing material 25, and it was understood that the performance significantly improved by using intermediate base matrices to which polysaccharides were immobilized.

Further, the protein recovery rates were high at a level of at least 94% in all packing materials.

Example 8

The packing materials 27 and 28 prepared in Production Examples 29 and 30 were packing materials wherein base matrices having an exclusion limit molecular weight of 2,100,000 as calculated as pullulan was used for CDI activation, and then 4-aminobenzoic acid and α-aminooctanoic acid were introduced respectively. In the same manner as in Example 7, the main peak elution time and BSA adsorption amount of each protein sample were measured for each of the packing materials. The obtained results are shown in Table 5.

As apparent from Table 5, it was confirmed that those packing materials adsorbed and retained various proteins under a weakly acidic condition and then the adsorbed proteins were eluted as the pH increased. Further, in both of the packing materials, it was confirmed that the adsorption amounts of BSA and IgG were very high at a level of at least 95 mg/ml. Further, the recovery rates were high at a level of at least 92% in all cases.

Example 9

The packing materials 29 to 32 prepared in Production Examples 31 to 34 were packing materials wherein base matrices having an exclusion limit molecular weight of 300,000 or 2,100,000 as calculated as pullulan were used to synthesize intermediate base matrices to which non-ionic polysaccharides were immobilized, and carboxy groups were introduced followed by NHS activation by using carbodiimide in an organic mixture, and then L-tryptophan was introduced. In the same manner as in Example 7, the main peak elution time and BSA and IgG adsorption amount of each protein sample were measured for each of the packing materials. The obtained results are shown in Table 6.

As apparent from Table 6, it was confirmed that those packing materials adsorbed and retained various proteins under a weakly acidic condition and then the adsorbed proteins were eluted as the pH increased. Further, in all packing materials, it was confirmed that the adsorption amounts of BSA and IgG were very high at a level of at least 85 mg/ml. In a case where the packing materials 29 and 30 derived from base matrices having a large exclusion limit molecular weight, the increasing effect of adsorption amount of IgG having a large molecular weight was high. In the case of packing materials 31 and 32 derived from base matrices having smaller exclusion limit molecular weights, the increasing effect of adsorption amount of IgG was relatively low while the increasing effect of adsorption amount of BSA was high. Further, the protein recovery rates were high at a level of at least 94% in all packing materials.

Example 10

The packing materials 33 to 35 prepared in Production Examples 35 to 37 were packing materials wherein base matrices having an exclusion limit molecular weight of 300,000 or 2,100,000 as calculated as pullulan were used to synthesize intermediate base matrices to which non-ionic polysaccharides were immobilized, and carboxy groups were introduced, and then NHS activation and ligand were introduced at the same time by using a water-soluble carbodiimide in a mixture of organic solvent and water. In the same manner as in Example 7, the main peak elution time and BSA and IgG adsorption amount of each protein sample were measured for each of the packing materials. The obtained results are shown in Table 6.

As apparent from Table 6, it was confirmed that those packing materials adsorbed and retained various proteins under a weakly acidic condition and then the adsorbed proteins were eluted as the pH increased. Further, in all packing materials, it was confirmed that the adsorption amounts of BSA and IgG were very high at a level of at least 100 mg/ml. In a case where the packing materials 33 and 34 derived from base matrices having a large exclusion limit molecular weight, the increasing effect of adsorption amount of IgG having a large molecular weight was high. In the case of packing material 35 derived from base matrices having a smaller exclusion limit molecular weight, the increasing effect of adsorption amount of IgG was relatively low while the increasing effect of adsorption amount of BSA was high. Further, the protein recovery rates were high at a level of at least 93% in all packing materials.

Example 11

The packing materials 36, 37 and 40 prepared in Production Examples 38, 39 and 42 were packing materials wherein base matrices having an exclusion limit molecular weight of 400,000 or 2,100,000 as calculated as pullulan were used to synthesize intermediate base matrices to which non-ionic polysaccharides or polysaccharide derivatives were immobilized, and carboxy groups were introduced and then NHS activation and ligand (L-tryptophan) were introduced at the same time by using a water-soluble carbodiimide in a mixture of organic solvent and water. In the same manner as in Example 7, the main peak elution time and BSA and IgG adsorption amount of each protein sample were measured for each of the packing materials. The obtained results are shown in Table 6.

As apparent from Table 6, it was confirmed that those packing materials adsorbed and retained various proteins under a weakly acidic condition and then the adsorbed proteins were eluted as the pH increased. Further, in all packing materials, it was confirmed that the adsorption amounts of BSA and IgG were very high at a level of at least 92 mg/ml. In a case where the packing materials 38 and 42 derived from base matrices having a large exclusion limit molecular weight, the increasing effect of adsorption amount of IgG having a large molecular weight was high. In the case of packing material 39 derived from base matrices having a smaller exclusion limit molecular weight, the increasing effect of adsorption amount of IgG was relatively low while the increasing effect of adsorption amount of BSA was high. Further, the protein recovery rates were high at a level of at least 94% in all packing materials.

Reference Example 2

The exclusion limit molecular weights of base matrices of the packing materials 38 and 39 prepared in Production Examples 40 and 41 correspond to those of packing materials 36 and 37 respectively, but a polysaccharide spacer was not immobilized. In other words, they were ion-exchange packing materials wherein carboxy groups were introduced directly to base matrices, and packing materials wherein NHS activation and ligand (L-tryptophan) were introduced at the same time by using a water-soluble carbodiimide in a mixture of organic solvent and water. In the same manner as in Example 7, the main peak elution time and BSA and IgG adsorption amount of each protein sample were measured for each of the packing materials. The obtained results are shown in Table 6.

As apparent from Table 6, it was confirmed that these packing materials adsorbed and retained various proteins under a weakly acidic condition, and the adsorbed proteins were eluted as the pH increased. However, even in a case where the packing material 39 having a pore property suitable for protein adsorption amount, the BSA and IgG adsorption amount did not reach to 65 mg/ml. In the case of the packing material 38 having a large exclusion limit molecular weight and smaller effective surface area, the adsorption amount was smaller. On the other hand, the adsorption amount of the packing materials 36 and 37 synthesized by using intermediate base matrices to which polysaccharides were immobilized were about three folds greater than that of the packing material 38, and it was understood that the performance significantly improved by using intermediate base matrices to which polysaccharides were immobilized.

Further, the protein recovery rates were high at a level of at least 93% in all packing materials.

The entire disclosures of Japanese Patent Application No. 2008-322642 filed on Dec. 18, 2008 and Japanese Patent Application No. 2009-058122 filed on Mar. 11, 2009 including specifications, claims and summaries are incorporated herein by reference in their entireties.

The invention claimed is:

1. A packing material for liquid chromatography comprising a base matrix, a ligand immobilized directly to the base matrix and a ligand immobilized to the base matrix via a spacer, wherein
(1) the base matrix is a hydrophilic base matrix having alcoholic hydroxy groups on its surface,
(2) the spacer is a synthetic polymer having alcoholic hydroxy groups, or a polysaccharide,
(3) the ligand is an α-amino acid represented by the following formula (1):

$$RCH(NH_2)COOH \quad (1)$$

wherein R is an aromatic group, an iso-butyl group, a n-butyl group, a $C_{5-7}$ non-ionic aliphatic group, or an aminomethyl benzoic acid, or the ligand is a mixture of α-amino acids represented by the above-formula (1),
(4) the ligand immobilized directly to the base matrix, is immobilized to the base matrix by an amide bond or an urethane bond via the amino group contained in the compound represented by the formula (1),
(5) the ligand immobilized to the base matrix via a spacer, is immobilized to the spacer by an amide bond or an urethane bond via the amino group contained in the compound represented by the formula (1), and
(6) the amount of the ligand immobilized to the base matrix is at least 30 mmol per liter (wet volume) of the packing material for liquid chromatography.

2. The packing material for liquid chromatography according to claim 1, wherein the α-amino acid is selected from the group consisting of phenylalanine, tryptophan, leucine, norleucine and α-aminooctanoic acid.

3. The packing material for liquid chromatography according to claim 1 or 2, wherein the base matrix is a carrier for chromatography selected from a group consisting of a natural polymer carrier, a synthetic polymer carrier and an inorganic carrier.

4. The packing material for liquid chromatography according to claim 1, wherein the base matrix is porous particles, and the exclusion limit molecular weight thereof is at least 100,000 as calculated as pullulan.

5. The packing material for liquid chromatography according to claim 1, wherein the spacer is said polysaccharide and said polysaccharide has a weight average molecular weight of at least 10,000 and has no anion-exchange groups, or its derivative.

6. A process for producing the packing material for liquid chromatography as defined in claim 1, which comprises activating the alcoholic hydroxy groups of the base matrix and the alcoholic hydroxy groups of the spacer with 1,1-carbonylbis-1H-imidazole in an organic solvent, and then reacting them with the amino group of the ligand in an organic solvent or a water-containing organic solvent to introduce the ligand directly and via the spacer to the base matrix by an urethane bond.

7. A process for producing the packing material for liquid chromatography as defined in claim 1, which comprises introducing carboxyl groups to the base matrix and the spacer, and then reacting them with the amino group of the ligand using a carbodiimide as a catalyst to introduce the ligand directly and via the spacer to the base matrix by an amide bond.

8. A process for separation and purification, or collection and recovery, of a biopolymer by liquid chromatography, which comprises adsorbing the biopolymer in an acidic aqueous solution with a pH of at most 5 by means of the packing material for liquid chromatography as defined in claim 1, and then desorbing the adsorbed biopolymer under a neutral or weakly basic condition with a pH of at most 9.

* * * * *